US011301243B2

(12) United States Patent
Mayer et al.

(10) Patent No.: US 11,301,243 B2
(45) Date of Patent: Apr. 12, 2022

(54) BIDIRECTIONAL EVALUATION FOR GENERAL—PURPOSE PROGRAMMING

(71) Applicant: THE UNIVERSITY OF CHICAGO, Chicago, IL (US)

(72) Inventors: Mikaël Mayer, Chicago, IL (US); Ravi Chugh, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 0 days.

(21) Appl. No.: 17/227,227

(22) Filed: Apr. 9, 2021

(65) Prior Publication Data

US 2021/0263729 A1 Aug. 26, 2021

Related U.S. Application Data

(63) Continuation of application No. 17/160,098, filed on Jan. 27, 2021, which is a continuation of application No. PCT/US2019/043846, filed on Jul. 29, 2019.

(60) Provisional application No. 62/711,252, filed on Jul. 27, 2018.

(51) Int. Cl.
*G06F 8/71* (2018.01)
*G06F 8/34* (2018.01)

(52) U.S. Cl.
CPC . *G06F 8/71* (2013.01); *G06F 8/34* (2013.01)

(58) Field of Classification Search
USPC .......................................................... 717/170
See application file for complete search history.

(56) References Cited

PUBLICATIONS

Matsuda et al., Applicative Bidirectional Programming . . . , Feb. 22, 2018, Journal of Functioning Programming, p. 1-51, (Year: 2018).*
Foster, Bidirectional Programming Languages,, 2009, Scholarly Commons, p. 1-24 (Year: 2009).*
Fischer et al., The Essence of Bidirectional Programming, Mar. 2015,, Science China Information Services, p. 1-21 (Year: 2015).*
Barbosa et al., "Matching Lenses: Alignment and View Update," *In International Conference on Functional Programming* (*ICFP*) 2010.
Bohannon et al., "Boomerang: Resourceful Lenses for String Data," *Symposium on Principles ofProgramming Languages* (*POPL*). 2007.
Bohannon et al., "Relational Lenses: A Language for Updateable Views," *Principles ofDatabase Systems* (*PODS*). 2005.

(Continued)

*Primary Examiner* — John Q Chavis
(74) *Attorney, Agent, or Firm* — Marshall, Gerstein & Borun LLP

(57) ABSTRACT

A method of facilitating bidirectional programming of a user may include receiving an original program source code and evaluating the original program source code in the forward direction to generate a program output. The evaluation may occur in a programming environment. The program output may be displayed, and an indication of the user corresponding to modifying the program output may be received. The modified program output may be evaluated to generate an updated program source code, wherein the updated program source code, when evaluated, may generate the modified program output. The modified program output may be displayed in a display device of the user. A computing system including a bidirectional programming environment may also be included.

20 Claims, 19 Drawing Sheets

(56) References Cited

PUBLICATIONS

Bostock et al., "D3: Data-Driven Documents," *IEEE Transactions on Visualization and Computer Graphics* (*VIS*) (2011).
Chlipala et al., "Strict Bidirectional Type Checking," *Workshop on Types in Languages Design and Implementation* (*TLDI*). 2005.
Chugh et al., "Prodirect Manipulation: Bidirectional Programming for The Masses," (2016). Retrieved from the Internet at: <URL:https://arxiv.org/pdf/1510.06788.pdf>.
Chugh et al., "Programmatic and Direct Manipulation, Together at Last," (2015). Retreived from the Internet at: <URL:https://arxiv.org/abs/1507.02988>.
Chugh et al., "Programmatic and Direct Manipulation, Together at Last," *Conference on Programming Language Design and Implementation* (*PLDI*). 2016.
Chugh, "HTML Table (Part 1) in Sketch-N-Stetch," YouTube (2018). Retrieved from the Internet at: <URL:https://www.youtube.com/watch?v=pp6yQPrd6bw&list=PLWFCLxeg6NJm7FNCf4WmLUCu0vxGNeFty&index=1 >.
Chugh, "Prodirect Manipulation: Bidirectional Programming for the Masses," *Companion Proceedings of the International Conference on Software Engineering* (*ICSE-C*), *Visions of 2025 and Beyond Track* (*V2025*). 2016.
Findler et al., "Slideshow: Functional Presentations," *Conference on International Conference on Functional Programming* (*ICFP*). 2004.
Findler et al., "Slideshow: Functional Presentations," *Journal ofFunctional Programming*, 16(4&5):583-619 (2006).
Foster et al., "Combinators for Bidirectional Tree Transformations: A Linguistic Approach to the View-Update Problem," *ACM Transactions on Programming Languages and Systems* (*TOPLAS*) 29, 3 (2007).
Frankie et al., "Example-Directed Synthesis: A Type-Theoretic Interpretation," *Symposium on Principles ofProgramming Languages* (*POPL*). 2016.
Github, "Sketch-n-Sketch," (2020). Retreived from the Internet at: <URL:https://github.com/ravichugh/sketch-n-sketch>.
Greenwald et al., "A language for bi-directional tree transformations," *Pat 333* (2003), 4444. Available at: <https://pdfs.semanticscholar.org/1138/0438de98f4625a491da253315466d5c34218.pdf>.
Hempel et al., "Deuce: A Lightweight User Interface for Structured Editing," *International Conference on Software Engineering* (*ICSE*). 2018.
Hempel et al., "Semi-Automated SVG Programming via Direct Manipulation," *Symposium on User Interface Software and Technology* (*UIST*). 2016.
Hu et al., "A Programmable Editor for Developing Structured Documents Based on Bidirectional Transformations," In *Proceedings of the 2004 ACM SIGPLAN Symposium on Partial Evaluation and Semantics-based Program Manipulation* (*PEPM '04*). ACM, New York, NY, USA, 178-189 (2004). Available at: <https://doi.org/10.1145/1014007. 1014025 <https://doi.org/10.1145/1014007.1014025>.
International Search Report and Written Opinion for Application No. PCT/US2019/043846, dated Oct. 23, 2019.
Kawanaka et al., "biXid: A Bidirectional Transformation Language for XML," *International Conference on Functional Programming* (*ICFP*). 2006.
Ko et al., "An Axiomatic Basis for Bidirectional Programming," (2018). Retrieved from the Internet at :<URL:https://delivery.acm.org/10.1145/3160000/3158129/popl18-p3.pdf?ip=35.163.112.150&id=3158129&acc=OA&key=4D4702B0C3E38B35%2E4D4702B0C3E 38835%2D4D4702B0C3D38B35%2EC1E31BC46E58D5B8&_acm_=1569437696_4e6586F1693a5709c8d7b51000cd5db9>.
Le et al., "S3: Syntax- and Semantic-Guided Repair Synthesis via Programming by Examples," *Foundations of Software Engineering* (*ESEC/FSE*). 2017.
Mayer at al., "Bidirectional Evaluation with Direct Manipulation," (2018). Retrieved from the Internet at: <URL:https://arxiv.org/pdf/1809.04209.pdf>.
Nakano et al., Consistent Web site updating based on bidirectional transformation. *International journal on software tools for technology transfer* 11, 6 (2009), 453. Available at: <http://link.springer.com/article/10. 1007/s10009-009-0124-3 <http://link.springer.com/article/10.1007/s10009-009-0124-3>.
Osera et al., "Type-and-Example-Directed Program Synthesis," *Conference on Programming Language Design and Implementation* (*PLDI*). 2015.
Pierce et al., "Local Type Inference," *ACM Transactions on Programming Languages and Systems* (*TOPLAS*) 22, 1 (2000), 1-44.
Pierce, "The Weird World of Bi-Directional Programming," (2006). Retrieved from the Internet at: <URL:https://www.cis.upenn.edu/~bcpierce/papers/lenses-etapsslides.pdf>.
Polikarpova et al., Program Synthesis from Polymorphic Refinement Types. In *Conference on Programming Language Design and Implementation* (*PLDI*). 2016.
Pothier et al., Scalable Omniscient Debugging. In *Object-Oriented Programming Systems and Applications* (*OOPSLA*). 2007.
Shneiderman, "Direct Manipulation: A Step Beyond Programming Languages," *Computer* (Aug. 1983).
Takeichi et al., "TreeCalc: Towards Programmable Structured Documents," *The 20th Conference of Japan Society for Software Science and Technology* 2003, 0 (2003), 81 -81. Available at: <https://www.researchgate.net/profile/Keisuke_Nakano/publication/228449571_TreeCalc_towards_programmable_structured_ documents/links/0912f506417a521d56000000.pdf <https://www.researchgate.net/profile/Keisuke_Nakano/publication/228449571_TreeCalc_towards_programmable_structured_ documents/links/0912f506417a521d56000000.pdf>.

* cited by examiner

| | | | |
|---|---|---|---|
| **Expressions** | $e$ | $::=$ | $c \mid x \mid \lambda p.e \mid e_1\, e_2 \mid e_1 :: e_2 \mid \{e \mid f = e_f\} \mid e.f$ |
| | | $\mid$ | $\texttt{let}\, p\, e_1\, e_2 \mid \texttt{letrec}\, p\, e_1\, e_2 \mid \texttt{if}\, e_1\, e_2\, e_3 \mid \texttt{case}\, e\, (p_1\, e_1) \cdots$ |
| | | $\mid$ | $\texttt{freeze}\, e \mid \texttt{applyLens}\, e_1\, e_2$ |
| **Constants** | $c$ | $::=$ | $n \mid b \mid s \mid [] \mid \{\} \mid (+) \mid (*) \mid (++) \mid (\&\&) \mid \texttt{not} \mid \cdots$ |
| | | $\mid$ | $\texttt{updateApp} \mid \texttt{diff} \mid \texttt{merge}$ |
| **Patterns** | $p$ | $::=$ | $c \mid x \mid p_1 :: p_2 \mid \{f_1 = p_1; \cdots\}$ |
| **Environments** | $E$ | $::=$ | $- \mid E, p \mapsto v$ |
| **Values** | $v$ | $::=$ | $c \mid (E, \lambda p.e) \mid [v_1, \cdots] \mid \{f_1 = v_1; \cdots\}$ |

Figura 1a

[E-Eval]

$$\frac{E \vdash \texttt{eval}\, e \Rightarrow s \qquad \textit{parse}(s) = e_1 \qquad - \vdash \texttt{eval}\, e_1 \Rightarrow v}{E \vdash \texttt{eval}\, e \Rightarrow v}$$

[U-Eval]

$$\frac{E \vdash \texttt{eval}\, e \Rightarrow s \qquad \textit{parse}(s) = e_1 \qquad - \vdash \texttt{eval}\, e_1 \Leftarrow v' \rightsquigarrow - \vdash e_1' \qquad \textit{unparse}(e_1') = s' \qquad E \vdash \texttt{eval}\, e \Leftarrow s' \rightsquigarrow E' \vdash e'}{E \vdash \texttt{eval}\, e \Leftarrow v' \rightsquigarrow E' \vdash e'}$$

Figure 1b

Evaluation $E \vdash e \Rightarrow v$ $$\frac{}{E \vdash c \Rightarrow c}\ \text{[E-Const]}$$

$$\frac{E = E_1,\ x \mapsto v, E_2 \quad x \notin dom(E_2)}{E \vdash x \Rightarrow v}\ \text{[E-Var]}$$

$$\frac{}{E \vdash \lambda p.e \Rightarrow (E,\ \lambda p.e)}\ \text{[E-Fun]}$$

$$\frac{E \vdash e_1 \quad (E_f,\ \lambda x.e_f) \quad E \vdash e_2 \Rightarrow v_2 \qquad E_f,\ x \mapsto v_2 \vdash e_f \Rightarrow v}{E \vdash e_1 e_2 \Rightarrow v}\ \text{[E-App]}$$

$$\frac{E \vdash e_1 \Rightarrow \texttt{True} \qquad E \vdash e_2 \Rightarrow v}{E \vdash \texttt{if}\ e_1 e_2 e_3 \Rightarrow v}\ \text{[E-If-True]}$$

$$\frac{E \vdash e \Rightarrow v}{E \vdash \text{freeze}\ e \Rightarrow v}\ \text{[E-Freeze]}$$

Evaluation Update $E \vdash e \Leftarrow v' \rightsquigarrow E' \vdash e'$ $$\frac{}{E \vdash c \Leftarrow c' \rightsquigarrow E \vdash c'}\ \text{[E-Const]}$$

$$\frac{E = E_1,\ x \mapsto v,\ E_2 \quad x \notin dom(E_2)}{E \vdash x \Leftarrow v' \rightsquigarrow (E_1,\ x \mapsto v',\ E_2) \vdash x}\ \text{[E-Var]}$$

$$\frac{}{E \vdash \lambda p.e \Leftarrow (E',\ \lambda p.e') \rightsquigarrow E' \vdash \lambda p.e'}\ \text{[E-Fun]}$$

$$\frac{\begin{array}{c} E \vdash e_1 \Rightarrow (E_f,\ \lambda x.e_f) \qquad E \vdash e_2 \Rightarrow v_2 \\ E_f,\ x \mapsto v_2 \vdash e_f \Leftarrow v' \rightsquigarrow (E'_f,\ x \mapsto v'_2) \vdash e'_f \\ E \vdash e_1 \Leftarrow (E'_f,\ \lambda x.e'_f) \rightsquigarrow E_1 \vdash e'_1 \\ E \vdash e_2 \Leftarrow v'_2 \rightsquigarrow E2 \vdash e'_2 \\ E' = E_1 \oplus_E E_2 \end{array}}{E \vdash e_1 e_2 \Leftarrow v' \rightsquigarrow E' \vdash e'_1 e'_2}\ \text{[U-App]}$$

$$\frac{E \vdash e_1 \Rightarrow \texttt{True} \qquad E \vdash e_2 \Leftarrow v' \rightsquigarrow E2 \vdash e'_2}{E \vdash \texttt{if}\ e_1 e_2 e_3 \Leftarrow v' \rightsquigarrow E2 \vdash \texttt{if}\ e_1 e'_2 e_3}\ \text{[U-If-True]}$$

$$\frac{E \vdash e \Rightarrow v}{E \vdash \text{freeze}\ e \Leftarrow v \rightsquigarrow E \vdash e}\ \text{[U-Freeze]}$$

Figure 2a

[E-Plus]

$$\frac{E \vdash e_1 \Rightarrow n_1 \qquad E \vdash e_2 \Rightarrow n_2}{E \vdash e_1 + e_2 \Rightarrow n_1 + n_2}$$

[E-Plus-1]

$$\frac{E \vdash e_1 \Rightarrow n_1 \qquad E \vdash e_1 \Leftarrow n' - n_1 \rightsquigarrow E_1 \vdash e'_1}{E \vdash e_1 + e_2 \Leftarrow n' \rightsquigarrow E_1 \vdash e'_1 + e_2}$$

[E-Plus-2]

$$\frac{E \vdash e_2 \Rightarrow n_2 \qquad E \vdash e_2 \Leftarrow n' - n_2 \rightsquigarrow E_2 \vdash e'_2}{E \vdash e_1 + e_2 \Leftarrow n' \rightsquigarrow E_2 \vdash e_1 + e'_2}$$

Figure 2b

$$\frac{E \vdash e_1 \Rightarrow v_1 \qquad E \vdash e_2 \Rightarrow [v_2, \cdots]}{E \vdash e_1 :: e_2 \Rightarrow [v_1, v_2, \cdots]} \text{[E-Cons]}$$

$$\frac{E \vdash e_1 \Leftarrow v'_1 \rightsquigarrow E_1 \vdash e'_1 \qquad E \vdash e_2 \Leftarrow [v'_2, \cdots] \rightsquigarrow E_2 \vdash e'_2 \qquad E' = E_1 \oplus_E E_2}{E \vdash e_1 :: e_2 \Leftarrow [v'_1, v'_2, \cdots] \rightsquigarrow E' \vdash e'_1 :: e'_2} \text{[U-Cons]}$$

$$\frac{E \vdash [e_1, \cdots, e_n] \Rightarrow v \qquad \Delta = \textit{Diff}\,(v, v') \qquad E \vdash [e_1, \cdots, e_n] \Leftarrow_{\textit{Diff}} \Delta \rightsquigarrow E' \vdash e'}{E \vdash [e_1, \cdots, e_n] \Leftarrow v' \rightsquigarrow E' \vdash e'} \text{[U-List]}$$

$$\frac{}{E \vdash [] \Leftarrow_{\textit{Diff}} [] \rightsquigarrow E \vdash []} \qquad \frac{E \vdash e_2 \Leftarrow_{\textit{Diff}} \Delta \rightsquigarrow E' \vdash e'_2}{E \vdash e_1 :: e_2 \Leftarrow_{\textit{Diff}} \textit{Keep} :: \Delta \rightsquigarrow E' \vdash e_1 :: e'_2}$$

$$\frac{E \vdash e_2 \Leftarrow_{\textit{Diff}} \Delta \rightsquigarrow E' \vdash e'_2}{E \vdash e_1 :: e_2 \Leftarrow_{\textit{Diff}} \textit{Delete} :: \Delta \rightsquigarrow E' \vdash e'_2} \qquad \frac{E \vdash e \Leftarrow_{\textit{Diff}} \Delta \rightsquigarrow E' \vdash e'}{E \vdash e \Leftarrow_{\textit{Diff}} \textit{Insert}(v') :: \Delta \rightsquigarrow E' \vdash \textit{exp}(v') :: e'}$$

$$\frac{E \vdash e_1 \Leftarrow v' \rightsquigarrow E_1 \vdash e'_1 \qquad E \vdash e_2 \Leftarrow_{\textit{Diff}} \Delta \rightsquigarrow E_2 \vdash e'_2 \qquad E' = E_1 \oplus_E E_2}{E \vdash e_1 :: e_2 \Leftarrow_{\textit{Diff}} \textit{Update}(v') :: \Delta \rightsquigarrow E' \vdash e'_1 :: e'_2}$$

Figure 2c

$$\frac{E \vdash e1.\texttt{apply}\; e2 \Rightarrow v}{E \vdash \texttt{applyLens}\; e1\; e2 \Rightarrow v} \text{[E-Lens]}$$

$$\frac{\begin{array}{c} E \vdash e2 \Rightarrow v2 \qquad v3 = \{\texttt{input} = v2;\ \texttt{outputNew} = v'\} \\ E, x \mapsto v3 \vdash e1.\texttt{update}\; x \Rightarrow \{\texttt{values} = [\cdots, v'_2, \cdots]\} \\ x \text{ fresh} \qquad E \vdash e_2 \Leftarrow v'_2 \rightsquigarrow E' \vdash e'_2 \end{array}}{E \vdash \texttt{applyLens}\; e_1\, e_2 \Leftarrow v' \rightsquigarrow E' \vdash \texttt{applyLens}\; e_1\, e'_2} \text{[U-Lens]}$$

$$\frac{\begin{array}{c} E \vdash e \Rightarrow \{\texttt{fun} = (E_1, \lambda x.ef);\ \texttt{input} = v_2;\ \texttt{outputNew} = v'\} \\ S = \{v'_2 \mid (E_1, x \mapsto v_2 \vdash ef \Rightarrow v' \rightsquigarrow E_1, x \mapsto v'_2 \vdash ef)\} \qquad |S| = n \end{array}}{E \vdash \texttt{updateApp}\; e \Rightarrow \{\texttt{values} = [S_1, \cdots, S_n]\}} \text{[E-Upddate-App]}$$

$$\frac{\begin{array}{c} E \vdash e_1 \Rightarrow v_1 \qquad E \vdash e_2 \Rightarrow v_2 \\ \Delta = \textit{Diff}(v_1, v_2) \end{array}}{E \vdash \texttt{diff}\; e_1\, e_2 \Rightarrow \textit{val}(\Delta)} \text{[E-Diff]} \qquad \frac{\begin{array}{c} E \vdash e_1 \Rightarrow v_1 \qquad E \vdash e_2 \Rightarrow [v_2, \cdots, v_n] \\ v = v_2 \oplus_{v_1} \cdots \oplus_{v_1} v_n \end{array}}{E \vdash \texttt{merge}\; e_1\, e_2 \Rightarrow v} \text{[E-Merge]}$$

Figure 2d

```
-- type alias MaybeOne a = List a

-- maybeMapSimple : (a -> b) -> MaybeOne a -> MaybeOne b
   maybeMapSimple f mx = case mx of [] -> []; [x] -> [f x]

-- maybeMapLens : Lens a (MaybeOne b)
   maybeMapLens default =
     { apply (f, mx) = Update.freeze maybeMapSimple f mx
     , update {input = (f, mx), outputNew = my} =
         case my of
           []  -> { values = [(f, [])] }
           [y] ->
             let z = case mx of [x] -> x; [] -> default in
             let res = Update.updateApp {fun (g,w) = g w, input = (f,z), outputNew = y}
             in { values = map (\(newF,newZ) -> (newF, [newZ])) res }
     }

-- maybeMap : a -> (a -> b) -> MaybeOne a -> MaybeOne b
   maybeMap default f mx = Update.applyLens (maybeMapLens default) (f, mx)
```

Figura 3a

```
listMapLens =
  { apply (f,xs) =
      Update.freeze (List.simpleMap f xs)
  , update { input = (f, oldInputList)
           , outputOld = oldOutputList
           , outputNew = newOutputList } =
      letrec walk diffOps maybePreviousInput oldInputs acc =
        case (diffOps, oldInputs) of
          ([], []) ->
            acc
          (KeepValue :: moreDiffOps, oldHead :: oldTail) ->
            let tails = walk moreDiffOps (Just oldHead) oldTail acc in
            List.simpleMap (\newTail -> (f, oldHead) :: newTail) tails
          (DeleteValue :: moreDiffOps, oldHead :: oldTail) ->
            let tails = walk moreDiffOps (Just oldHead) oldTail acc in
            tails
          ((UpdateValue newVal) :: moreDiffOps, oldHead :: oldTail) ->
            let tails = walk moreDiffOps (Just oldHead) oldTail acc in
            let heads =
              (Update.updateApp {fun (a,b) = a b, input = (f, oldHead), output = newVal}).values
            in
            List.cartesianProductWith List.cons heads tails
          (( nsertValue newVal) :: moreDiffOps, _) ->
            let headOrPreviousHead =
```

Figure 3b
(to be continued)

```
          case (oldInputs, maybePreviousInput) of
            (oldHead :: _, _) -> oldHead
            ([], Just oldPreviousHead) -> oldPreviousHead
        in
        let tails = walk moreDiffOps maybePreviousInput oldInputs acc in
        let heads =
          (Update.updateApp {fun (a,b) = a b, input = (f, headOrPreviousHead), output = newVal}).values
        in
        List.cartesianProductWith List.cons heads tails
  in
  let newLists =
    walk (Update.listDiff oldOutputList newOutputList) Nothing oldInputList [[]]
  in
  let newFuncAndInputLists =
    List.simpleMap (\newList ->
      let (newFuncs, newInputList) = List.unzip newList in
      let newFunc = Update.merge f newFuncs in
      (newFunc, newInputList)
    ) newLists
  in
  { values = newFuncAndInputLists }
}
listMap f xs =
  Update.applyLens listMapLens (f, xs)
```

Figure 3b
(continuation)

| Example | LOC | Eval | #Upd | #Sol | Fastest Upd | Slowest Upd | Average Upd |
|---|---|---|---|---|---|---|---|
| States Table A* | 37 | 304±20 | 11 | 1.18 | 57±5 | 154±20 | 85±20 200x |
| States Table B* | 126 | 774±70 | 7 | 1 | 256±40 | 456±50 | 331±50 700x |
| Recipe* | 193 | 1455±80 | 17 | 1.05 | 243±30 | 2237±200 | 1328±500 16x |
| Budgetting | 37 | 328±11 | 7 | 2 | 7±0.9 | 13±2 | 9±2 80x |
| MVC | 71 | 720±50 | 10 | 1 | 216±10 | 483±120 | 289±80 40x |
| Linked-Text | 91 | 855±40 | 5 | 1.2 | 1886±140 | 2252±300 | 2025±200 5x |
| Markdown | 128 | 1179±110 | 6 | 1 | 1369±90 | 1889±150 | 1607±200 13x |
| Dixit | 130 | 705±40 | 15 | 1 | 87±6 | 2205±4000 | 417±1500 120x |
| Translation | 122 | 357±20 | 8 | 2 | 187±12 | 1085±200 | 415±200 50x |
| LATEX in HTML | 534 | 1648±200 | 6 | 1 | 413±50 | 3183±500 | 943±1000 150x |
| *Total* / Average | *1469* | 833±400 | 92 | 1.18 | | | (723±900) (70x) |

```
TableWithButtons =
  let wrapData rows =
    let blankRow =
      let numColumns =
        case rows of
          []     -> 0
          row::_ -> List.length row
      in
      List.repeat numColumns "?"
    in
    Update.applyLens
      { apply rows =
          Update.freeze
            (List.map (\row -> (Update.freeze False, row)) rows)

      , update {outputNew = flaggedRows} =
          let processRow (flag, row) =
            if flag == True
              then [ row, blankRow ]
              else [ row ]
          in
          { values = [List.concatMap processRow flaggedRows] }
      }
      rows
  in
  let mapData f flaggedRows =
    List.map (Tuple.mapSecond f) flaggedRows
  in
  let tr =
    ...
  in
  { wrapData = wrapData
  , mapData = mapData
  , tr = tr
  }
```

Figure 5h

```
Html =
  let elementHelper tag styles attrs children =
    [ tag, ["style", styles] :: attrs , children ] in
  let textElementHelper tag styles attrs text =
    elementHelper tag styles attrs [["TEXT", text]] in
  { div = elementHelper "div"    , table = elementHelper "table"
  , tr  = elementHelper "th"     , td    = textElementHelper "td"
  , h1  = textElementHelper "h1" , h2    = textElementHelper "h2" , ... }
```

```
function outputToInputEditAction(hEditAction, dEditAction, dStackPath) {
  let childEditActions = dEditAction.childEditActions;
  if(dEditAction.kind.ctor === DUType.Reuse) {
    let relPath = dEditAction.kind.path;
    if(isIdPath(relPath))
      return mergeDEditActions(foreach(childEditActions)((k, d) =>
        outputToInputEditAction(hEditAction, d, cons(k, dStackPath))), "single");
    let sourceStackPath      = composeStackPath(dStackPath, relPath);
    let dPathOriginal        = followStackPath(hEditAction, dStackPath);
    let dSourcePathOriginal  = followStackPath(hEditAction, sourceStackPath);
    let clonePath            = makeRelative(dPathOriginal, dSourcePathOriginal);
    let diffsFromChildren = mergeDEditActions(foreach(childEditActions)((k, d) =>
      outputToInputEditAction(hEditAction, d, cons(k, sourceStackPath))), "single");
    let [relEditAction, absEditAction] = partitionAndMakeRelative(
          List.reverse(dSourcePathOriginal), diffsFromChildren);
    let cloneAndEditAction = andThen(DCloneUpdate(clonePath), relEditAction);
    return merge2DEditActions(DUpdatePath(dPathOriginal, cloneAndEditAction), absEditAction);
  } else {
    let dPathOriginal        = followStackPath(hEditAction, dStackPath);
    if(noChildEditActions(dEditAction))
      return DUpdatePath(dPathOriginal, dEditAction);
    let newChildEditActions = {};
    let diffsFromChildren = mergeDEditActions(foreach(childEditActions)((k, d) => {
      let cd = outputToInputEditAction(hEditAction, d, dStackPath);
      let [relEditAction, absEditAction] = partitionAndMakeRelative(
        List.reverse(dPathOriginal), cd); newChildEditActions[k] = relEditAction;
      return absEditAction;
    }), "single");
    return merge2DEditActions(DUpdatePath(dPathOriginal, DNew(dEditAction.kind.model,
                                    newChildEditActions)), diffsFromChildren);
  }
}
```

Figure 8

BV Evaluation $E \vdash e \Rightarrow_{BV} v$

[BV-E-Const] $$\frac{}{E \vdash c \Rightarrow c}$$

[BV-E-Fun] $$\frac{}{E \vdash \lambda x.e \Rightarrow (E, \lambda x.e)}$$

[BV-E-Var] $$\frac{}{E \vdash x \Rightarrow E(x)}$$

[BV-E-App] $$\frac{E \vdash e_1 \Rightarrow (E_f, \lambda x.e_f) \quad E \vdash e_2 \Rightarrow v_2 \quad E_f, x \mapsto v_2 \vdash e_f \Rightarrow v}{E \vdash e_1\, e_2 \Rightarrow v}$$

BV Evaluation Update $E \vdash e \Leftarrow_{BV} v' \rightsquigarrow E' \vdash e'$

[BV-U-Const] $$\frac{}{E \vdash c \Leftarrow c' \rightsquigarrow E \vdash c'}$$

[BV-U-Fun] $$\frac{}{E \vdash \lambda x.e \Leftarrow (E', \lambda x.e') \rightsquigarrow E' \vdash \lambda x.e'}$$

[BV-U-Var] $$\frac{}{E \vdash x \Leftarrow v' \rightsquigarrow E[x \mapsto v'] \vdash x}$$

[BV-U-App] $$\frac{\begin{array}{c} E \vdash e_1 \Rightarrow (E_f, \lambda x.e_f) \\ E \vdash e_2 \Rightarrow v_2 \\ E_f, x \mapsto v_2 \vdash e_f \Leftarrow v' \rightsquigarrow E'_f, x \mapsto v'_2 \vdash e'_f \\ E \vdash e_1 \Leftarrow (E'_f, \lambda x.e'_f) \rightsquigarrow E_1 \vdash e'_1 \\ E \vdash e_2 \Leftarrow v'_2 \rightsquigarrow E_2 \vdash e'_2 \end{array}}{E \vdash e_1\, e_2 \Leftarrow v' \rightsquigarrow E_1 {}^{e_1}\boxtimes^{e_2} E_2 \vdash e'_1\, e'_2}$$

Figure 9

BN Evaluation $D \vdash e \Rightarrow_{BN} u$

[BN-E-Const] $$\frac{}{D \vdash c \Rightarrow c}$$

[BN-E-Fun] $$\frac{}{D \vdash \lambda x.e \Rightarrow (D, \lambda x.e)}$$

[BN-E-Var] $$\frac{D(x) = (D_x, e) \quad D_x \vdash e \Rightarrow u}{D \vdash x \Rightarrow u}$$

[BN-E-App] $$\frac{D \vdash e_1 \Rightarrow (D_f, \lambda x.e_f) \quad D_f, x \mapsto (D, e_2) \vdash e_f \Rightarrow u}{D \vdash e_1\, e_2 \Rightarrow u}$$

BN Evaluation Update $D \vdash e \boxtimes_{BN} u' \rightsquigarrow D' \vdash e'$

[BN-U-Const] $$\frac{}{D \vdash c \Leftarrow c' \rightsquigarrow D \vdash c'}$$

[BN-U-Fun] $$\frac{}{D \vdash \lambda x.e \Leftarrow (D', \lambda x.e') \rightsquigarrow D' \vdash \lambda x.e'}$$

[BN-U-Var] $$\frac{D(x) = (D_x, e) \Leftarrow D_x \vdash e \quad u' \rightsquigarrow D'_x \vdash e'}{D \vdash x \Leftarrow u' \rightsquigarrow D[x \mapsto (D'_x, e')] \vdash x}$$

[BN-U-App] $$\frac{\begin{array}{c} D \vdash e_1 \Rightarrow (D_f, \lambda x.e_f) \\ D \vdash e_1 \Rightarrow (D_f, \lambda x.eD_{ff}), x \mapsto (D, e_2) \vdash e_f \Leftarrow u' \rightsquigarrow D'_f, x \mapsto (D_2, e'_2) \vdash e'_f \\ D \vdash e_1 \Leftarrow (D'_f, \lambda x.e'_f) \rightsquigarrow D_1 \vdash e'_1 \end{array}}{D \vdash e_1\, e_2 \Leftarrow u' \rightsquigarrow D_1 {}^{e_1}\oplus^{e_2} D_2 \vdash e'_1\, e'_2}$$

Figure 10

Forward K-Evaluation $(D \vdash e; S) \Rrightarrow u$

[K-E-Const]

$$\frac{}{(D \vdash c; []) \Rrightarrow c}$$

[K-E-Fun]

$$\frac{}{(D \vdash \lambda x.e\, ; []) \Rrightarrow (D,\ \lambda x.e\ )}$$

[K-E-Var]

$$\frac{D(x) = (\ D_x,\ e) \qquad (D_x \vdash e; S) \Rrightarrow u}{(D \vdash x; S) \Rrightarrow u}$$

[K-E-Fun-App]

$$\frac{(D_f,\ x \mapsto (D_2,\ e_2) \vdash e_f\, ; S) \Rrightarrow u}{(D_f \vdash \lambda x.e_f\, ;(D_2,\ e_2) :: S) \Rrightarrow u}$$

[K-E-App]

$$\frac{(D \vdash e_1;(D,\ e_2) :: S) \Rrightarrow u}{(D \vdash e_1\, e_2; S) \Rrightarrow u}$$

Backward K-Evaluation $(D \vdash e; S) \Lleftarrow u' \rightsquigarrow (D' \vdash e'; S')$

[K-U-Const]

$$\frac{}{(D \vdash c; []) \Lleftarrow c' \rightsquigarrow (D \vdash c'; [])}$$

[K-U-Fun]

$$\frac{}{(D \vdash \lambda x.e\, ; []) \Lleftarrow (D',\ \lambda x.e') \rightsquigarrow (D' \vdash \lambda x.e'; [])}$$

[K-U-Var]

$$\frac{D(x) = (\ D_x,\ e) \qquad (D_x \vdash e; S) \Lleftarrow u' \rightsquigarrow (D'_x \vdash e'; S')}{(D \vdash x; S) \Lleftarrow u' \rightsquigarrow (D[x \mapsto (D'_x,\ e')] \vdash x; S')}$$

[K-U-Fun-App]

$$\frac{(D_f,\ x \mapsto (D_2,\ e_2) \vdash e_f\, ; S) \Lleftarrow u' \rightsquigarrow (D'_f,\ x \mapsto (D'_2,\ e'_2) \vdash e'_f; S')}{(D_f \vdash \lambda x.e_f\, ;(D_2,\ e_2) :: S) \Lleftarrow u' \rightsquigarrow (D'_f \vdash \lambda x.e'_f;(D'_2,\ e'_2) :: S')}$$

[K-U-App]

$$\frac{(D \vdash e_1;(D,\ e_2) :: S) \Lleftarrow u' \rightsquigarrow (D_1 \vdash e'_1;(D_2,\ e'_2) :: S')}{(D \vdash e_1\, e_2; S) \Lleftarrow u' \rightsquigarrow (D_1\, {}^{e_1}\!\boxtimes^{e_2} D_2 \vdash e'_1\, e'_2; S')}$$

Figure 11

BIDIRECTIONAL EVALUATION FOR GENERAL—PURPOSE PROGRAMMING

CROSS-REFERENCE TO RELATED APPLICATION

This application is a continuation of U.S. patent application Ser. No. 17/160,098, filed on Jan. 27, 2021, which is a continuation of International Patent Application No. PCT/US/2019/043846, filed Jul. 29, 2019, which claims the benefit of and priority to U.S. Provisional Application No. 62/711,252, filed Jul. 27, 2018. The contents of the preceding applications are incorporated herein in their respective entireties.

GOVERNMENT LICENSE RIGHTS

This invention was made with government support under grant number 1651794 awarded by the National Science Foundation. The government has certain rights in the invention.

REFERENCE TO A "SEQUENCE LISTING," A TABLE, OR A COMPUTER PROGRAM LISTING APPENDIX SUBMITTED AS AN ASCII TEXT FILE

The present application hereby incorporates by reference the entire contents of the following text files in the computer program listing appendix, each in ASCII format and created on Feb. 14, 2022:

| Name | Size in Bytes |
|---|---|
| 01-JavascriptImplementation.txt | 28619 |
| 02-JavascriptVerificationTests.txt | 5665 |
| 03-LazySubstitutionBasedLambdaCalcululsTest5.txt | 2300 |
| 04-SubstitutionBasedLambdaCalcululsComputingArgumentFirstTests.txt | 2504 |
| 05-EnvironmentBasedCallByNameLambdaCalculusTests.txt | 3835 |
| 06-EnvironmentBasedCallByValueL8mbdaCalculusTests.txt | 5195 |
| 07-KrivineEvaluator.txt | 3515 |

The above files are included in a compact disc (Copy 1) that is accompanied by an identical duplicate disc (Copy 2).

FIELD OF THE DISCLOSURE

The present disclosure generally relates to a system and method for facilitating bidirectional program evaluation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the disclosure.

Direct manipulation user interfaces have been developed for a wide variety of domains, such as word processing, diagrams, spreadsheets, data visualizations, presentations, and web applications. Such interfaces allow users to experiment with the digital objects they are creating in rapid fashion, where small edits and actions are immediately and interactively displayed. Despite the benefits of a direct manipulation graphical user interface (GUI), programmers often choose to write programs to generate content, in order to harness abstraction capabilities that are severely limited in typical direct manipulation systems. For example, programmers may use languages and libraries such as p5.js, Processing, JavaScript, Ruby, Elm, Microsoft PowerPoint, LATEX, Racket Slideshow, and D3. Users of such libraries may write code that, when executed, causes output to be created, including presentation data (e.g., slides, graphics, styled text, data-driven documents, and/or visualizations). The output may be encoded in an open file format such as Hypertext Markup Language (HTML), a semi-open format such as Microsoft Word Document (.doc) format, or a closed-source/proprietary format.

However, the power of programming creates non-negligible complexity. Namely, to change the output of a program in a traditional programming environment, the user/programmer must edit the source code, run (e.g., compile, interpret, etc.) it again, and view the new output, often repeating this loop for a long time (e.g., months or even years) while developing a project. This cycle is sometimes referred to as the "edit-run-view" or "edit-compile-run" cycle, and it wastes users' time. The amount of time and effort spent in this way is particularly wasteful when successive edits to the program and the effects of those edits on the resulting output are small and/or narrow in scope. The current state of the art requires users to edit code of a computer program even in cases where editing the output of the computer program might seem the most logical and/or natural thing to do, from the perspective of a user. This is true even when changes to the output are small, relative to the amount of work that must be performed in the code to produce those changes.

Historically, two primary approaches have been advanced with the goal of allowing programs to run "in reverse." However, both approaches suffer from serious drawbacks. A first approach, developed in bidirectional programming languages, allows certain computations to be specified as "lenses," wherein a "get" function for forward-evaluation is paired with a "put" function for backwards-evaluation, where the latter serves as a sensible complement to the former. Although lenses are a powerful tool for a variety of tasks—including transformations over relational, semi-structured, and unstructured data—lenses are not a solution for automatically reversing the computation of an arbitrary program written in a general-purpose computer programming language.

Another challenge in the literature on lenses relates to defining a reversible list map function. For example, some prior art approaches define lists using records, and the mapping function is parameterized by a lens. However, that approach cannot add or remove elements, nor change the original lens. Some prior art approaches include a set of well-typed lens combinators for creating HTML forms that can write back the data, including inserting and deleting elements. However, these approaches require lenses at every step, and it is not possible to modify the style from the output (e.g., by removing a <br> tag) without changing it directly in the source code. At least one prior art approach overcomes the problem of inserting and deleting elements by duplicating elements from the output. Another approach acknowledges that a modified function constant causes the update procedure to fail.

A second approach aims to reverse arbitrary programs by an interpreter first recording value traces to track the provenance of how values are computed, and then, when a user makes small changes to output, solving updated value-trace equations to synthesize repairs to the program. This approach suffers from numerous limitations, including that although tracing and updates for numeric values are supported, the tracing of other types of simple or more complex values is not supported. Also, this approach does not allow advanced users to customize the behavior of the algorithm, which represents a significant limitation in practice, because no single update algorithm for arbitrary programs can work well in all use cases. Furthermore, even assuming for the sake of argument that the tracing approach could be extended to address the aforementioned limitations, all computations would be required to be traced even if many or most values were never updated by the user. For programs where the subset of values that are directly manipulated becomes a small fraction, the space overhead of this approach could become a bottleneck, as is often the case for other types of programs with heavy tracing requirements (e.g., omniscient debuggers).

Prior work in automated program repair and synthesis, bidirectional programming, and combining programming languages with direct manipulation user interfaces has included attempts to generate and manipulate Scalable Vector Graphic (SVG) documents, and has proposed that GUI features should be co-designed with program transformations that aim to make "large," structural, often semantics-changing edits that codify the user actions. Prior work has been proposed allowing "small" changes to output values to be reconciled through local updates to the program. However, such approaches record value traces for all numeric values, and when the user updates a number, the corresponding value-trace equation is immediately solved, applied to the program, and the new output is rendered. The resulting workflow provides a continuous, "live" interaction for equations that can be solved in almost real-time. When multiple valid solutions are found, the prior approaches may employs simple heuristics to automatically choose an output, favoring continuous updates over user interaction to resolve intent. In such systems, arbitrary types of values cannot be changed, custom update behavior cannot be defined, and time overhead (from re-evaluation) is traded to save space overhead (from recording traces).

Evaluation update is similar to program repair, and tools to repair HTML-producing programs do exist (e.g., for PHP Hypertext Preprocessor (PHP)). Such tools fix string literals out of context, or globally based on a set of corrected input/outputs, by creating string equations and minimizing the number of string literals to correct. Although these approaches may provide acceptable results in some cases, such approaches are not able to correct strings that were computed, stored in and/or retrieved from variables, which is a very common practice if the HTML template comes from another file. The prior approaches are unable to back-propagate modifications either on constants or on variables, and cannot deal with various string transformations.

In fact, the conventional approaches for writing inverse evaluators, or "unevaluators" include serious shortcomings. First example, the evaluator is separate from the unevaluator and consequently, ensuring that the unevaluator is actually in sync with the evaluator is error-prone, especially because of complex pattern matching, partial closure evaluation, and so on. Second, the evaluator is called from the unevaluator, and without caching intermediate results, the update algorithm is much slower than the evaluator because it has to repeatedly call the evaluator itself.

In summary, although known bidirectional programming languages can evaluate certain classes of functions in reverse, current approaches do not enable evaluation of functions in reverse for arbitrary programs written in general-purpose languages.

BRIEF SUMMARY

In one aspect a method of facilitating bidirectional programming of a user includes receiving an original program source code, evaluating the original program source code to generate a program output, displaying one or both of (i) the original program source code, and (ii) the program output in a first display device of the user, receiving an indication of the user corresponding to modifying the program output, and evaluating the modified program output to generate an updated program source code, wherein the updated program source code, when evaluated, generates the modified program output.

In another aspect a computing device configured for bidirectional programming of textual data by a user via a graphical user interface includes a least one display device, at least one processor, and at least one memory. The memory may include computer-readable instructions that, when executed by the at least one processor, cause the computing device to display, in the at least one display device, an original program source code and a program output corresponding to the evaluated original program source code. The instructions may further cause the computing device to receive an indication of the user corresponding to modifying the program output, and to evaluate the modified program output to generate an updated program source code.

BRIEF DESCRIPTION OF THE DRAWINGS

FIG. 1*a* depicts a syntax of a bidirectional programming language supporting bidirectional evaluation for programs, according to one embodiment, FIG. 1*b* depicts a syntax of a bidirectional programming language supporting bidirectional evaluation of dynamic code, according to one embodiment, FIG. 2*a* depicts evaluation semantics for bidirectional programming for programs, according to one embodiment, FIG. 2*b* depicts evaluation semantics for evaluation and update for arithmetic operations in a bidirectional programming language, according to one embodiment, FIG. 2*c* depicts a rule set implementing evaluation and update for lists in a bidirectional programming language, according to one embodiment, FIG. 2*d* depicts a rule set implementing evaluation and update for user-defined lenses and primitive helper functions, according to one embodiment, FIG. 3*a* depicts a custom lens for lists with one or fewer elements, FIG. 3*b* depicts a custom lens for lists with an arbitrary number of elements, FIG. 5*h* depicts a computer program source code for implementing certain aspect of the graphical interface facility of FIG. 5*i*, according to an embodiment, FIG. 8 depicts an example back-propagation algorithm, according to an embodiment, FIG. 9 depicts call-by-value evaluation semantics, according to an embodiment, FIG. 10 depicts call-by-name evaluation semantics, according to an embodiment; and FIG. 11 depicts bidirectional Krivine evaluation semantics, according to an embodiment.

DETAILED DESCRIPTION

Figures 4, 5A:
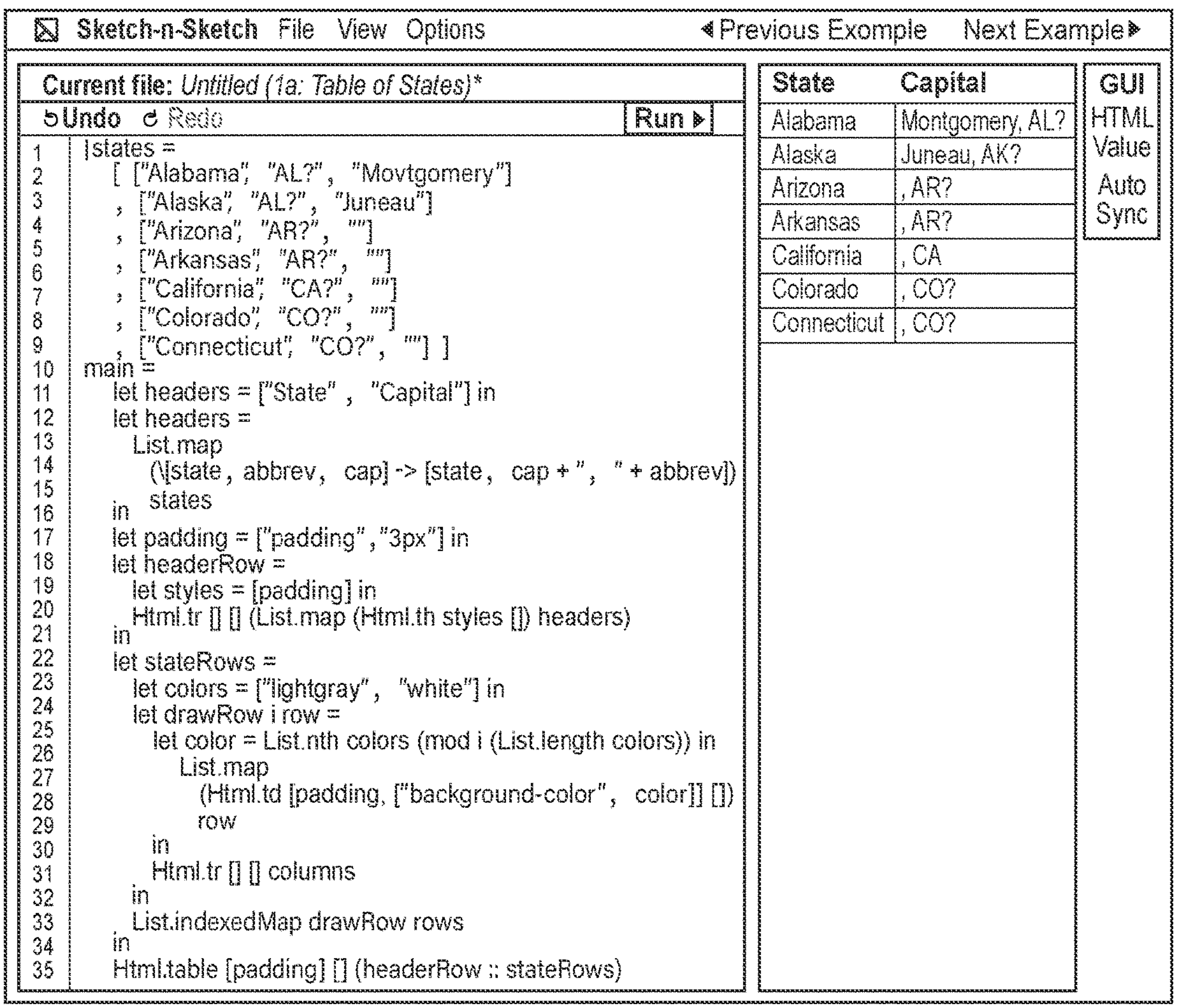
FIG. 4 depicts a table of benchmark data relating to numerous example programs.
FIG. 5*a* depicts a programming environment including an initial prototype of a computer program, according to an embodiment.

Although the following text sets forth a detailed description of numerous different embodiments, it should be understood that the legal scope of the description is defined by the words of the claims set forth at the end of this text. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

In contrast to prior approaches, the present application discloses a method and system of bidirectional evaluation for programs in a full-featured, general-purpose functional programming language. The system and method of bidirectional evaluation with direct manipulation described herein facilitates the ability of the user and/or author of a computer program to directly manipulate the output of the program, and the ability of the user/author to evaluate the program "in reverse," using the manipulated output to automatically compute necessary edits to the source code of the program. In the bidirectional evaluation techniques described herein, arbitrary programs in a general-purpose functional language can be run in reverse in order to produce useful edits to the program. The system and method provide a straightforward and natural way for users to express changes to source code by directly manipulating the output of programs, and to express changes to the output of programs by directly manipulating the source code. The method and system allow evaluation of the program "in reverse," using the new expected output as specified by the user to help synthesize the necessary program repairs/edits.

The methods and systems may synthesize updates to the program based on changes to the output of the program using an evaluation update algorithm, or simply, update algorithm. The update algorithm may include retracing the steps of the original evaluation and rewriting the program as needed to reconcile differences between the original source code and the output. Compared to typical evaluation, the evaluation update algorithm receives an expected output value as an argument to help synthesize repairs to the expression such that it computes the expected value. Further, programmers may define custom lenses to augment the update algorithm with more advanced or domain-specific program updates. Herein, the user of the methods and systems may alternately be referred to as a "user," a "developer," a "programmer," etc. In some cases, a first person may author code, and a second person may manipulate the output of the authored code. In some cases, the first person and/or the second person may be non-programmers or non-technical users (e.g., a graphic designer). In an embodiment, the manipulation of output of the authored code may be performed by a computer software process, such as a set of computer-readable instructions. Example custom update lenses for several common functional programming patterns are described herein, as extensions to the "built-in" evaluation update algorithm.

Sometimes differences may be propagated that prevent the entire program from being unevaluated. The present techniques allow the use of lenses to handle such differences, to handle only the concerned portions. The update methods may also handle and produce differences. In particular, in place of an ordinary function application $e_{get}$ e, users of the present techniques can define a lens application applyLens {apply=$e_{get}$; update=$e_{put}$} e, in which case, the unevaluation algorithm uses the designated update function $e_{put}$ to help compute a new expression e' to replace the argument e.

In addition to an evaluation relation e⇒v that evaluates expression e to value v, an evaluation update (or simply, update) relation e⇐v'⇝e' is described herein which, given an expected value v', rewrites the original expression e to e'.

Evaluation update may proceed by comparing the original output value v with the goal v', and synthesizing repairs toe such that, ideally, the new program e' evaluates to v'. Evaluation update may be defined for arbitrary expressions e producing arbitrary types of values v. The approach described herein may include uninstrumented evaluation such that expressions are re-evaluated as needed during update.

The following discussion includes example embodiments of a direct manipulation programming environment/system for interactively editing documents (e.g., HTML documents), wherein a user may author programs in a language to generate output, wherein the user may directly manipulate the output using a GUI such as a web browser, and wherein the output is evaluated "in reverse" to generate an updated program source code. In one embodiment, a built-in facility of a web browser may be used to manipulate the HTML output, such as a DOM inspector. In another embodiment, the program itself may include instructions which provide the ability to add, modify, and/or delete structural elements from the output. In some embodiments, when the user directly manipulates the output using the GUI, the update algorithm may reconcile the changes in the output with the source code of the program.

Example Language Syntax

The following includes a description of an example embodiment in which the concepts of bidirectional evaluation for programs have been implemented in a full-featured, general-purpose functional programming language. Several optional performance-based optimizations to the evaluation update algorithm are also described. However, in some embodiments, the concepts described herein may include a programming language or paradigm wherein fewer or more constructs are included. In some embodiments, a procedural, imperative, and/or object-oriented language may implement the bidirectional evaluation concepts. In some embodiments, the full-featured, general-purpose functional programming language embodiment described herein provide unique benefits for the integration of programmatic and direct manipulation.

Fundamental Syntax

FIG. 1*a* depicts a fundamental syntax for a lambda-calculus that models the language supported by the present techniques is presented. FIG. 1*a* includes definitions for expressions e, spread across three lines and corresponding respectively to:

- constants c, variables x, function application $e_1$ $e_2$, list construction $e_1$::$e_2$, record extension {e|f=$e_f$}, record field projection e.f,
- (simple and recursive) let-bindings let x $e_1$ $e_2$, conditionals if $e_1$ $e_2$ $e_3$, and case expressions case e ($p_1$ $e_1$) . . . ; and
- evaluation update.

The fundamental syntax of FIG. 1*a* includes constants c including numbers n, booleans b, strings s, the empty list [ ], the empty record { }, and built-in primitive operators, including operators for arithmetic, logic, and custom lenses. In particular, the primitive operators updateApp, diff, and merge facilitate the definition of custom lenses, which are discussed below. The values v include constants, closures (E, λp.e) where the environment E binds free variables in the body of the function λp.e, and lists and records with zero or more components.

Extended Syntax

The fundamental syntax of FIG. 1*a* may be extended with additional programming conveniences to support programming practical applications, optimizations and other enhancements to turn the evaluation update relation into an algorithm suitable in a practical setting, and user interfaces for manipulating HTML output values and choosing program updates. For example, in addition to the constants, lists, and records presented in the fundamental syntax, the enhanced syntax may support tuples and user-defined data types, which are transformed (i.e., de-sugared) internally to records. The extended syntax may also support value-indexed dictionaries with an arbitrary number of bindings. The syntax compatible with an ML-style type system, and some embodiments may include type checking. In still further embodiments, variable definition strings, string interpolation, and dynamic code evaluation, and other useful constructs may be included, according to some scenarios.

Programs that generate HTML and parse HTML typically perform a large amount of string processing and JavaScript code generation, and utilize common data structures. Language extensions facilitating such tasks are described in the following sections.

Regular Expressions

The extended implementation includes two common regular expression operators. The first operation, extract re s, takes a regular expression re (as a string) and a string s to transform, and optionally returns a list of all the groups of the first match of re to s. The update semantics include taking a set of non-overlapping modified groups—taken greedily from the right—and pushing them back to their original place in the original string. For example, extract "b(.)" "bab" produces Just ["a"]. If the result is updated to Just ["x"], the string s is updated to "bxb".

The second operation, replace re ƒ s, takes a regular expression re, a function ƒ, and a string s to transform. The function argument provides access to the match information, including the index into the string, the subgroups and their positions, the global match, and the replacement number. The function uses this information to produce a string. Interestingly, the final string after replacement is an interleaved concatenation of strings that did not change and applications of the lambda to the record associated to each match. For example, in the string "arrow", if the expression "(rr|w)" is replaced with the function ƒ=λm. if m.match=="w" then "r" else "rm", then an expression is created that looks like "*a*"+ƒ{match="*rr*"}+"*o*"+ƒ{match="*w*"}.

This expression may be used both for evaluation and update. For update, the update procedure may first be run on this expression. Then, in the environment, an updated function ƒ' may be recovered. To update the original string s, the information about the matches that changed (including the subgroups) is gathered and applied to s.

Using the reversible extract operation, a String library may be constructed which includes reversible variants of several common string-processing operations: take, drop, match, find, toInt, trim, uncons, and sprintf.

Long String Literals

Many languages allow string literals to refer to variables or expressions, which are then expanded (i.e., interpolated). The present techniques provide long string literals—distinguished by triple double quotes and which may span multiple lines—that support string interpolation of expressions (written """@(e)"""). To further facilitate string processing tasks, the present techniques also allow variables to be defined within long string literals (written """@let x e; s""").

Dynamic Code Evaluation

The present techniques allow for other common web programming patterns to be achieved. For example, the present techniques allow the dynamic computation of strings that are meant to parse and evaluate as expressions. The present techniques include a dynamic code evaluation primitive, eval e, for this purpose. The evaluation and update rules follow.

FIG. 1*b* depicts an evaluation and update rule for dynamic code, according to an embodiment. The evaluation rule E-Eval parses the evaluated string s in the empty environment. This is distinct from JavaScript, for example, where the generated code is evaluated in the environment in which it was generated. If the programmer would like for the generated code to have access to the environment, the toString primitive—which converts the environments of closures into nested let-expressions—can be used. For example, toString (x↦2, λy.x+y) evaluates to "let *x*=2 in *y*→*x*+*y*".

The update rule U-Eval uses the unparser to push the updated code string s' back to the expression e that generated it. In some embodiments, eval may be associated with an environment including a string/value pair. The current environment may be captured using a construct (e.g., CurrentEnv), and eval and update may be performed in the current environment, a custom environment reflecting only some functions, and/or a sandbox mode with no environment Whitespace and Formatting So that updated programs remain readable and conducive to subsequent programmatic edits, the present techniques take care to insert and remove whitespace in a way that respects the whitespace conventions of surrounding expressions. To achieve this improvement in usability, whitespace in between expressions and concrete syntax tokens is recorded in an abstract syntax tree, and these are used to determine how much whitespace to insert before, between, and/or after newly created expressions. Bidirectional evaluation semantics are introduced in the next section.

Example Bidirectional Update Semantics

FIG. 2*a* depicts the bidirectional evaluation semantics for a subset of possible expression forms, including big-step evaluation rules listed in the left column, and evaluation update (or simply, update) rules listed in the right column. By analogy to bidirectional type checking, evaluation may be thought of as "value synthesis" and evaluation update as "value checking." An environment-expression pair E⊢e may be referred to as a program. The evaluation update judgment E⊢e⇐v'⇝E'⊢e' states that "when updating its output value to v', the program E⊢ updates to E'⊢e'." An outcome wherein only the expression (resp. environment) changes may be conventionally referred to by stating that, "the expression (resp. environment) updates to a new expression (resp. environment)." Similarly, an evaluation update may be conventionally referred to by stating, "push v' (or changes to v) back to e." The evaluation update judgment does not refer to the original value v produced by the program; if the original value is needed by a premise of an update rule, it must be re-computed.

Update Rules

Simple Rules

Update rules may not recursively refer to the update judgment. For example, the axiom U-Const states that, when updating the output value of an expression to c', the expression c updates to c'; the environment E remains unchanged. The rule U-Var states that, when updating the output value of an environment to v', the environment E updates to E'. This updated environment is like the original, except that x is bound to the new value v'; the expression x remains unchanged. The rule U-Fun states that, when updating the output value of a program to the closure (E', λp.e'), the program E⊢λp.e updates to E'⊢λp.e'. Although updating closures in the output of a program may be less common than other types of values, the U-Fun rule is nevertheless crucial for the following derived rules.

FIG. 2*b* depicts evaluation and update rules for addition. There are two update rules, U-Plus-1 and U-Plus-2, which, respectively, re-evaluate the left or right operand ($e_1$ or $e_2$) to a number ($n_1$ or $n_2$) and then push back the updated difference ($n'-n_1$ or $n'-n_2$) entirely to that operand. Because there are two update rules, there are two valid program updates for addition expressions. Additional numeric primitive operations (not shown in FIG. 2*b*) are handled in similar fashion. The update rules are applied "automatically" to all relevant (sub)expressions when trying to reconcile the program with a new output value.

In some embodiments, arithmetic rules may produce unexpected results. For example, pushing 4 to let x=1 in x+x may result in let x=3 in x+x, which evaluates to 6. In practice this pattern may be useful because it is non-blocking. Alternatively, it may be possible to add rules to push back symbolic expressions such as w to the x on the left side of the expression, and 4−w to the x on the right side of the expression, such that after unification a solver outputs the expected let x=2 in x+x.

The freeze e expression is semantically a no-op (E-Freeze in FIG. 2*a*). However, this provides the programmer one simple way to control the update algorithm, by requiring that the expression e and values v it computes remain unaltered (U-Freeze in FIG. 2*a*).

Function Application

The treatment of function application is at the heart of the evaluation update relation. FIG. 2*a* depicts a rule, E-App, for evaluating function calls; to simplify the presentation, that rule assumes that the function argument is a variable x rather than an arbitrary pattern, as in our implementation.

The corresponding update rule is U-App. The first two premises re-evaluate the function $e_1$ to a closure ($E_f$, λx.$e_f$) and the argument $e_2$ to a value $v_2$. The third premise pushes the updated value v' back through the function call, specifically, through the function body $e_f$, where the closure environment is extended with the binding x↦$v_2$ (as during evaluation).

This produces a (potentially updated) function body $e'_f$ and (potentially updated) environment $E'_f$, x↦$v_2'$ that is structurally equivalent to the original (their domains are equal). The value bound to x in the new environment is the (potentially updated) value $v_2'$.

At this point, the function body and its environment have been updated. Next, the fourth premise pushes this program, in the form of the closure ($E_f'$, $\lambda x.e_f'$), back to the original function expression $e_1$; the result is a new program $E_1 \vdash e_1'$. Then, the fifth premise pushes the new argument $v_2'$ back to the original argument expression $e_2$; the result is a new program $E_2 \vdash e_2'$. Thus, the updated function application expression is $e_1'e_2'$.

What remains is to reconcile $E_1$ and $E_2$ with the original E. The rules ensure that $E_1$ and $E_2$ are both structurally equivalent to E, but each may have induced updates to one or more bindings in E. As demonstrated with a subsequent example, updated bindings may conflict—there may be variables y such that E(y), $E_1(y)$ and $E_2(y)$ are all different. Next, an approach to combining these environments is described.

Environment, Value, and Expression Merge

Several rules must consider multiple candidate environments $E_1$ and $E_2$ when deciding how to update an original environment E. For this purpose, a three-way environment merge operation is defined: $E_1 \oplus_E E_2$ $$(E_1, x \mapsto v_1) \oplus_{(E, x \mapsto v)} (E_2, x \mapsto v_2) = E', x \mapsto (v_1 \oplus_v v_2)$$
where $E' = E_1 \oplus_E E_2$.

The three-way environment merge traverses the three structurally equivalent environments, performing a three-way value merge on each value binding. The value merge operation $v_1 \oplus_v v_2$ (not depicted) recursively traverses the subvalues of three structurally equivalent values, until the rule for base cases—for merging constants—chooses $v_2$ if it differs from v (even if $v_2$ and $v_1$ conflict) and $v_1$ otherwise. It should be appreciated that other merge algorithms may be employed, in some embodiments. For example, updates from the left may be preferred in the merge algorithm, or all combinations of choices may be propagated. One of the important benefits of the present techniques is that the methods and systems for customizing evaluation update disclosed herein enables users to readily define such alternatives.

Closure values include expressions, so a three-way expression merge operation $e_1 \oplus_e e_2$ is also implemented (not shown) in similar fashion for closures.

List Construction

FIG. 2*c* depicts an evaluation rule (E-Cons) for list construction, and a corresponding update rule (U-Cons) that propagates changes to the head (resp. tail) value back to the head (resp. tail) expression. The list construction and update rules preserve the structure of existing cons expressions. In this embodiment, structure-changing rules that add and/or remove cons expressions are not included, due to the potential for introducing ambiguity.

List Literals: Pretty Local Updates

The evaluation update rules discussed above may produce updated (environments and) expressions that are structurally equivalent to the original ones. Such structure-preserving changes are referred to herein as local updates. Restricting changes to local updates ensures a predictable class of "small" changes, but is so restrictive that even seemingly benign changes are not possible—e.g. updating the empty list expression [ ] with new value [1].

Such updates may need to be allowed for practical purposes. Therefore, some embodiments may include the rule U-List (FIG. 2*c*) to allow insertion and deletion inside list literals that appear in the program. This form of structural change as pretty local to emphasize its limited effect on the program structure. The statement $[e_1, \ldots, e_n]$ may be expressed, as syntactic sugar for the nested list construction expression $e_1 :: \ldots :: e_n :: [\,]$, terminating with the empty list.

The helper procedure Diff(v, v') takes the original and updated list values and computes a value difference Δ (a "delta"), in this case, a sequence of list difference operations—Keep, Delete, Insert(v'), or Update(v'). In an embodiment, the implementation of Diff uses a dynamic programming approach which attempts to preserve as many contiguous sequences from the original list as possible. The syntax of the evaluation update judgment is reused for one that pushes back value differences (rather than just values), with the subscript Diff to help distinguishing the two syntaxes. The expression $E \vdash [e_1, \ldots, e_n] \Leftarrow_{Diff} \Delta \rightsquigarrow E' \vdash e'$ computes the list literal e' that results from traversing the original list literal and the difference operations; keeping, inserting, deleting, or updating expressions as dictated by the difference. It should be appreciated that some embodiments may include differences for insertion, deletion, update, cloning, swapping, wrapping, unwrapping, and/or any other suitable operations.

String, Records, and Dictionaries

Evaluation rules (not shown) for string concatenation $e_1 + e_2$, record literals $\{f_1 = e_1; \ldots\}$, and record extension $\{e | f = e_f\}$ may also be included, in some embodiments.

Dictionary values may be constructed using primitive operators empty, get, insert, remove, and fromList. Update rules for dictionaries may be implemented in much the same way as those for lists. For example, the update rules may be based on dictionary difference operations, analogous to the list difference operations discussed above. Update rules for records and record extension may also be implemented using similar principles as those discussed with respect to lists above, except that those update rules may not include insertions and/or deletions. Update rules for concatenating strings and appending lists require a more nuanced approach, as explained in the next section.

Customizing Evaluation Update

Because of the inherent expressiveness of the language, evaluation update may not provide all possible intended behaviors that users may desire. For example, the common evaluation and update pattern below may not be handled by the update algorithm as discussed thus far. In this example, metavariables f and $x_i$ may refer to expressions and $y_i$ to refer to values.

$$E \vdash \text{map } f\,[x_1, x_3, x_4] \Longrightarrow [y_1, y_3, y_4]$$

$$E \vdash \text{map } f\,[x_1, x_3, x_4] \Longleftarrow [y_1', y_2, y_3, y_4', y_5]$$

$$\rightsquigarrow \underbrace{E' \vdash \text{map } f'\,[x_1', x_2, x_3, x_4', x_5]}_{\textit{Desired, but unavailable, program repair}}$$

The Diff operation computes the following alignment between the original and updated values: that $y_1$ and $y_4$ have been updated to $y_1'$ and $y_4'$, and new values $y_2$ and $y_5$ have been inserted after (the updated versions of) $y_1$ and $y_4$. A user may desire an updated program of the form indicated above, where f', $x_1'$, and $x_4'$ are updated because of the two updated function calls f $x_1$ and f $x_4$, and where the synthesized values $x_2$ are $x_5$ are passed to the function *f*', ideally producing the inserted values $y_2$ and $y_5$. However, the evaluation update approach described so far cannot synthesize repairs of the desired form above. Given the definition letrec map *f* list=case list of [ ]→[ ];*x::xs*→*f x*::map *f xs* the original list value $[y_1, y_3, y_4]$ is constructed completely within the body of map: non-empty (cons) nodes are created in the list=x::xs branch and the empty node is created in the list=[ ] branch. To reconcile the updated list, $y_5$ would have to be inserted into the empty list [ ] in map, and element $y_2$ would have to be inserted into the cons-node. Besides the fact that the present techniques strive to disallow structural updates anywhere but E-List (cf. the "List Literals: Pretty Local Updates" discussion, infra), such changes are not desirable because the new cons-node would not be the result of applying f to anything. Rather, the new cons-node would insert the same element in between all elements in the output. Furthermore, map is a library, the definition of which is, ideally, frozen.

Therefore, the evaluation update is unable to provide simultaneous reasoning about structural changes to list values and computations they pass through.

User-Defined Lenses

Rather than attempting to provide built-in support for map and other common building blocks, the present techniques choose to expose an API for users (or libraries) to customize the evaluation update. Specifically, in place of any "bare" function *f*, the user may additionally provide a second update function in the program source code that specifies how to push values back to calls to f.

A pair comprising bare and update functions forms a lens, which is implemented using the syntax described above as a record with the following type:

type alias Lens *a* *b*={apply:*a*→*b*,update:{input:*a*, outputNew:*b*}→{values:List *a*}}

The above lens definition is typed, and the expression applyLens $e_1$ $e_2$ syntactically marks the function application as a lens application in lieu of a particular type. Either a typed record or untyped record may be used, according to some embodiments.

FIG. 2*d* includes an E-Lens rule, which projects the apply field of the lens argument $e_1$ and then applies it to the argument $e_2$. To push a new value v' back to the lens application applyLens $e_1$ $e_2$, the U-Lens rule may use the update function of the lens. The function argument is then re-evaluated to $v_2$ and, together with the new output v', is passed to the $e_1$.update function. Each value $v_2'$ in the values list of results is pushed back to the expression argument $e_2$ and then used as the argument of the updated function call expression.

Because the lens mechanism in the FIG. 1*a* is intended to provide a way to customize the built-in update algorithm, several internal operators are exposed (updateApp, diff, and merge) which custom update functions can refer to. FIG. 2*d* also describes the semantics of these operations as they arise in the discussion below. Because these operations are intended for use only in update functions, evaluation rules are defined for these operators, but update rules are not. However, in an embodiment, both update and/or evaluation rules may be defined.

Optimizations

The present techniques include several additional optimizations for the evaluation update relation, to form the basis for a practical algorithm.

Optimization 1: Tail-Recursive Update

A direct implementation of the program update algorithm may result in a call stack that increases with each recursive call to update. Because the stack space in some interpretation environments (e.g., in web browsers) is relatively limited, this recursive approach may lead to exceptions for computational-intensive benchmarks, even relatively small ones. Because the heap space is usually less limited than stack space, a rewriting of the update procedure to continuation-passing style makes the update procedure tail-recursive and, thus, compiles to an optimized form in some embodiments (e.g. in JavaScript the procedure compiles to a while-loop). This transformation is compatible with a lazy list of all solutions computed by the algorithm. In some embodiments, the tail-recursive transformation can be used to repeatedly pause the computation, for purposes of creating a non-blocking implementation (e.g., in a singlethreaded interpretation environment such as in JavaScript).

Optimization 2: Merging Closures

Merging environments naïvely—following the definition of $E_1 \oplus_E E_2$—may require exponential time, in some embodiments. Each closure in the environment refers to the prefix of the environment, which may have been modified. Hence, to compare closures, their environments must be compared, and so on. In some embodiments, merging bindings for only those variables which appear free in the associated function bodies may be a critical optimization step.

Optimization 3: Propagating and Merging Edit Differences

In some embodiments, an evaluation update judgment which propagates expected values v', even though large portions of v' may be identical to the original values v, is another potential scalability issue. To address this, some embodiments may compute an edit difference between v and v' which, together with those values, serves as a compact but complete characterization of the changes. For example, for numbers and booleans, the edit difference can be represented as a Boolean flag indicating whether the value has changed (i.e., whether U-Const needs to process this value).

For lists, the edit difference may be represented as a list of index ranges associated with a number of insertions, a number of removals, or an update based on a value difference. Edit differences for other types of values, for expressions, and for environments may also be analyzed, in some embodiments. These edit differences may be propagated through the evaluation update algorithm.

Further, edit differences may be exposed to user-defined lenses, so that they can benefit from this optimized representation. First, compared to the presentation of U-Lens in FIG. 2*d*, the field outputOld may be included in the record argument $v_3$ to update: its value V is the original result of the function call $e_1$.apply $e_2$. The update function can choose to take outputOld into account when returning its list of new argument valueS. Furthermore, to take advantage of the optimized representation, the record argument may also contain a diffs field that describes the edit differences that turn outputOld into outputNew. In an embodiment, the update function may return a diffs field (in addition to values). Then, the evaluation update algorithm can continue to propagate changes using the optimized representation. Reasoning with values and diffs can be thought of as "states" and "operations", respectively, in the terminology of synchronization. A foldDiff helper function may also be defined, and used to define edit difference-based versions of the reversible map and append lenses described above.

Correctness

In an embodiment, the ideal connection between evaluation and update would be the following proposition:

Proposition 1 (Total Correctness of Update). If $E \vdash e \Rightarrow v$ (i.e. the program $E \vdash e$ evaluates to v) and $E \vdash e \Leftarrow v' \rightsquigarrow E' \vdash e'$ (i.e. when updating its output value v', to the program updates to $E' \vdash e'$), then $E' \vdash e' \Rightarrow v'$ (i.e. the updated program will evaluate to the updated value).

However, Proposition 1 is false, for two primary reasons. The first reason is because conditional expressions, in particular the U-If-True rule depicted in FIG. 2*a*, pushes the updated value back to the true-branch, which was taken during the original evaluation, optimistically assuming that the same branch will be taken by the new program. The U-If-False rule (not shown) makes an analogous assumption about the false-branch. In general, however, these assumptions may be violated. For example, the expression (λx. if x==1 then x else 3) 1 evaluates to 1. If the user updates the value to 2, the change will be pushed back to the then-branch (and then back through the variable use to the function argument), resulting in the updated expression (λx. if x==1 then x else 3) 2. When evaluated, this expression takes the false-branch and produces 3. If the false-branch happened to return 2, the updated program would "accidentally" produce the correct updated value.

The second obstacle is that multiple updates may induce conflicting program updates. For example, the expression (λx.[x, x])1 evaluates to [1, 1]. If updated to [0, 2], the U-App, U-Cons, and U-Var rules, together with right-biased environment merge, combine to update the program to (λx.[x, x])2, which, when re-evaluated, produces [2, 2].

To address the former problem, control-flow-alternating updates could be disallowed. To address the latter problem, environment merge could fail to produce an output when there are conflicts, and the algorithm could require that all uses of a variable in the output be updated in a consistent manner. However, such variations may not be pursued in some embodiments, due to the insight that total correctness is not of paramount importance for the practicality of evaluation update in practice. For example, several of the example use cases for direct manipulation interaction depicted herein purposely alter control-flow (e.g., because of a change to a Boolean flag). Therefore, instead of pursuing a strong correctness property, users are enabled to consider the effects of various program updates using a programming environment.

However, if all uses of a variable in the output are updated consistently, then a roundtrip guarantee exists that the value produced by the final updated program will be the same value that was being pushed back. This idea is formalized in Proposition 2:

Proposition 2 (Weaker correctness property). Given an update tree, if at any level where $E \vdash e \Leftarrow v' \rightsquigarrow E' \vdash e'$ and $E' = E_1 \rightsquigarrow_E E_2$ and each $E_i$ is the environment over a sub-expression $e_i'$, and furthermore for every variable x updated in E' and every $E_i$, either x was updated with the same value in $E_i$ or it did not appear as a free variable in $e_i$, then $E' \vdash e' \Rightarrow v_1'$.

Proof. Given an evaluation update tree and the premises of Proposition 2, by structural induction on the tree, if $E \vdash e \Leftarrow v' \rightsquigarrow E' \vdash e'$, then $E' \vdash e' \Rightarrow v'$.

- For U-Const, given $E \vdash c \Leftarrow c' \rightsquigarrow E' \vdash c'$, it is true that $E \vdash c' \Rightarrow c'$
- For U-Var, $E' \vdash e'$ is equivalent to $(E_1, x \rightsquigarrow v', E_2) \vdash x$ where x does not appear in $E_2$ so this expression evaluates to v' because of E-Var.
- For U-Fun, $E \vdash \lambda x.e \Leftarrow (E', \lambda x.e) \rightsquigarrow E' \vdash \lambda x.e'$ so therefore $E' \vdash \lambda x.e' \Rightarrow (E', \lambda x.e')$ without further discussion.
- For U-App, assuming $E \vdash e_1\ e_2 \Leftarrow v' \rightsquigarrow E' \vdash e_1'\ e_2'$, it is required that $E \vdash e_1 \Rightarrow (E'', \lambda x.e)$, $E \vdash e_2 \Rightarrow w$, $E'', x \rightarrow w \vdash e \Leftarrow v' \rightsquigarrow E'''$, $x \rightarrow w' \vdash e'$, $E \vdash e_1 \Leftarrow (E''', \lambda x.e) \rightsquigarrow E_1 \vdash e_1'$, $E \vdash e_2 \Leftarrow w' \rightsquigarrow E_2 \vdash e_2$ and $E' = E_1 \oplus_E E_2$.

To evaluate $E' \vdash F\ e_1' e_2'$, evaluate $E' \vdash e_1'$ and $E' \vdash e_2'$. First, by induction on the last three update rules, one obtains that: $E_1 \vdash e_1' \Rightarrow (E''', \lambda x.e')$, $E_2 \vdash e_2 \Rightarrow w'$ and $E'''$, $x \rightarrow w' \vdash e' \Rightarrow v'$.

Second, by proving that: $E' \vdash e_1'$ evaluates to the same value as $E_1 \vdash e_1'$, and $E' \vdash e_2'$ evaluates to the same value as $E_2 \vdash e_2'$, by applying the evaluation rules, $E' \vdash e_1'\ e_2' \Rightarrow v'$.

To prove two previous points, it is sufficient to show that all free variables of $e_1'$ have the same value in E' and $E_1$. If this was not the case, it would mean that, either

- A free variable in $e_1'$ was not updated in $E_1$ but was updated in $E_2$ with a new value. According to Proposition 2's premises, this is not possible: Because the variable appears in $e_1'$, it should have been updated in $E_1$ with the same value
- A free variable in $e_1'$ was updated in $E_1$ but the same variable was updated in $E_2$ with a different value, and the conflict resolution chose $E_2$'s value. This is trivially not possible because the premises of Proposition 2 states that there were no conflicts.

Similar reasoning proves the second point.

Corollary 0.0.1 (Updated variables used once). Given an update tree, at any level where $E \vdash e \Leftarrow v' \rightsquigarrow E' \vdash e'$, if every variable x that was updated in E' appear only once in e', then $E' \vdash e' \Rightarrow v_1'$.

Proof. If every updated variable x in E' appears at most (thus exactly) once in e', then given that $E' = E_1 \oplus_E E_2$ and that the sub-expressions $e_1$ and $e_2$ are disjoint, the updated value of x in E' comes from exactly one $E_1$ (or resp. $E_2$) and x did not appear as a free variable in the other $e_2$ (resp. $e_1$), Proposition 2 applies.

Example Lenses

Lens: Maybe Map

The following describes a simple example of mapping a "MaybeOne" value, encoded as a list with either zero or one elements, using the principles discussed above. FIG. 3*a* depicts a definition of maybeMapSimple, which is frozen to prevent changes to what is, effectively, a "library" function in some embodiments. When reversing calls to maybeMapSimple, the built-in update algorithm may be unable to deal with adding or removing elements from the argument list (as with list map, discussed above).

Therefore, FIG. 3*a* defines a custom lens called maybeMapLens. To deal with the case when the updated value includes an element when there was none before, this lens is parameterized by a default element. The lens functions apply and update take arguments f and mx as a pair. The maybeMap definition on the last line of FIG. 3*a* is defined as the application of this lens (wrapped in applyLens) to its arguments packaged up in a pair. In the forward direction, the apply function of maybeMapLens simply invokes maybeMapSimple. In the reverse direction, the update function uses a record pattern to project the input and outputNew fields and handles two cases. If the new output my is [ ], the updated MaybeOne value should be [ ], and the function f is left unchanged—these are paired and returned as a singleton list of result values. If the new output my is [y], the goal is to push y back through a call of f. If the original input maybe value mx is [x], then the function call f z=f x needs to be updated. If the original input maybe value is [ ], however, there was no original input; so, f z=f default needs to be updated.

To achieve this in FIG. 3*a*, the primitive updateApp operator is used to push y back through f z using the built-in algorithm (starting with rule U-App). The semantics of this operation, which may correspond to E-Update-App of FIG. 2*d*, computes all possible updated values $v_2'$ and puts them in a In this way, updateApp may expose the U-App rule to custom update functions.

Each value that comes out in results.values includes a pair of a possibly-updated function newF and possibly-updated argument newX. To finish, the second is wrapped in list and this pair forms a solution. This function "bootstraps" from the primitive U-App rule, lifting its behavior to the MaybeOne type. For example, consider the function display [*a*,*b*,*c*]=[*a*,*c*+", "+*b*]

and two calls to maybeMap defaultState display, where the definition defaultState=["?","?","?"]

serves as placeholder state data:

maybeRow1=maybeMap defaultState display [["New Jersey","NJ","Edison"]]

maybeRow2=maybeMap defaultState display [ ]

As a preview, a specific example of this type of lens is depicted in FIG. 5*a*), at line 14: updating the result of maybeRow1 to [ ] leads to updating the argument to [ ]. Updating the result of maybeRow2 to [["New Jersey", "Edison, N.J."] ] leads to updating the argument to [["New Jersey", "NJ", "Edison"]]. Furthermore, updating the result of maybeRow2 to [["New Jersey", "Edison N.J."]] simultaneously inserts the appropriate three-element list and changes the separator "," to " ". None of these three interactions would be possible if instead calling maybeMapSimple display, which is updated by the built-in algorithm alone.

Additional Lenses

The maybeMapLens definition demonstrates an approach for dealing with updated transformed values—pushing them back through function application, as usual—and for dealing with newly inserted values—pushing them back through function application with a default element. This approach may be extended, in some embodiments, to a listMapLens definition that operates on lists with arbitrary numbers of elements rather than just zero or one, using a recursive traversal as follows:

1. the use of primitive operator diff (for which E-Diff in FIG. 2*d* exposes the Diff operation used by E-List) to align the original and updated output lists,
2. the use of primitive operator merge (for which E-Merge exposes the three-way value merge operation) to combine multiple updates to the input function; and
3. when inserting a new element into the output list, choosing to use an adjacent element from the original list (rather than a caller-specified default) to push back through a function call.

FIG. 3*b* defines a listMapLens for operating on lists with an arbitrary number of elements. The high-level structure of update uses a library function, Update.listDiff, defined in terms of a more general primitive diff operator. Update.listDiff produces a list of difference operations—KeepValue, DeleteValue, InsertValue(v), and UpdateValue(v)—which are Leo encodings of those returned by Diff in E-List. The update function recursively walks the difference operators, keeping, dropping, or updating elements as dictated. In one embodiment, the leftmost existing element is used, if any, as the "default" value argument to the function call that is pushed back.

A number of cases are examined. If there was an insertion at the beginning of a non-empty list, there was no leftmost element, wherein the rightmost element (the singleton) is used. If there is an insertion in an empty list, then update fails to produce a solution, rather than requiring an explicit default value to be chosen. In an embodiment, updated functions are also collected, and at the end they are combined together using the built-in merge operation. There are many other reasonable ways to define update for this lens, and by exposing this choice, users may provide custom implementations as appropriate to suit their own purposes.

HTML-to-String Lens

A lens for parsing an HTML string to a list of encoded HTML nodes may be included in some embodiments. The HTML-to-String lens illustrates the challenge of tolerating a variety of potentially-malformed documents, and carefully tracking whitespace, quotation marks, and other characters that are not stored in the resulting DOM, all of which are needed to respect the formatting conventions of the program. Because these characters are respected, in some embodiments, users may copy-and-paste HTML strings into long string literals for convenience.

'fancyIf' Lens

In some embodiments, such as when evaluating programs whose structure and control-flow are mostly correct, guard expressions may not need to be changed. However, guard expression modification can be defined with lenses, in other embodiments. For example, the 'fancyIf' function below employs a lens to augment the built-in approach for updating if-expressions (pushing values back to the same branch) with the ability to change the guard expression. If the original guard c evaluates to True and the original else branch e evaluates to the updated value v, then pushing False back to c constitutes a second solution, called 'updateGuard'. The treatment for when c evaluates to False is analogous:

```
fancyIf cond thn els =
  Update.applyLens
  { apply (c, t, e) = if c then t else e
  , update {input=(c,t,e), outputNew=v} =
    let updateSameBranch =
      if c then (c, v, e) else (c, t, v)
    in
    let updateGuard =
      if (c && e == v) | | (not c && t == v)
        then [(not c, t, e)]
        else []
      in
      { values = updateSameBranch::updateGuard }
    }
    (cond, thn, els)
```

In another embodiment, the value may be pushed back to the other branch even if it does not already evaluate to the desired value v. Such variations can be implemented easily using the present techniques.

It should be appreciated that many other examples of lenses are possible. For example, a lens may be defined for appending lists, which generates multiple candidate solutions when inserting elements at the "split" between the two input lists. An evaluation update for concatenating strings may do the same. Several custom update functions helpful for achieving a variety of desirable interactions for bidirectional functional documents are described with respect to FIG. 4.

Evaluation and Benchmarks

FIG. 4 depicts a table of benchmark data related to the execution of a plurality of example programs. In practice, many diverse examples comprising hundreds of lines of code have been created using a programming system for developing and editing HTML documents and web applications, based on the techniques discussed above. The example programs are designed to facilitate a variety useful direct manipulation interactions enabled through bidirectional evaluation, and they demonstrate that a variety of interactive documents and applications—such as web pages, Markdown-to-HTML translators, a $L^{A}T_{E}X$-to-Html editor, and scalable recipe editors—can be programmed using the techniques described herein in a way that allows direct manipulation changes to propagate automatically back to the program.

Moreover, these evaluations demonstrate that the present techniques may synthesize program repairs very quickly (e.g., within 0 to 2 seconds) in full-featured interactive settings. These examples also demonstrate how a variety of HTML documents and applications can be developed and edited interactively using the present techniques, thereby mitigating or even eliminating the tedious edit-run-view cycle drawbacks discussed above that plague traditional programming and/or software development environments. Although the examples discussed herein relate to HTML and web-based programming, the present techniques allow programmers and end users to combine programming with direct manipulation in any programming domain/paradigm. Specific evaluation examples are discussed below, in addition to the direct manipulation interactions the examples enable.

Evaluation Examples

States Table

The States Table A benchmark in FIG. 4 includes direct manipulation text and DOM edits, and the States Table B benchmark corresponds to interactions with custom buttons. Bidirectional evaluation via DOM editing is discussed below, with respect to FIG. 5*d* and FIG. 5*i*. In some embodiments, custom user interface features may be constructed by:

1. defining a lens that, in the forward direction, attaches extra "state" to some data and, in the backwards direction, refers to the updated state to determine how to update the data; and
2. (ii) exporting HTML elements that store the state and handling events in some JavaScript code generated as strings according to the above syntax that map browser events to edits to the state.

Scalable Recipe Editor

A culinary recipe may be presented in such a way that ingredient amounts can be scaled easily with respect to a desired number of servings. The source of the recipe is stored as a string containing HTML code. There, every occurrence of "multdivby(p,q)" is first replaced using regexes, the implementation of which was discussed above, by the number (p/q)*servings, where servings is defined for the entire recipe. The resulting string is then evaluated by a String-to-HTML lens. To insert the quantity "5 eggs" proportional to a current number of servings of 10, users can simply enter "_5_ egg" in the output, and the "_5_" is replaced by custom lenses to "multdivby(5,10)" in the source text. Similarly, inserting "_5s_" inserts a conditional plural in "s". Because all proportional quantities are connected to servings through invertible arithmetic operations, the user can edit any of the values as desired—e.g., to scale the recipe to make 32 servings, or to find how many servings can be made with 12 eggs—all others are updated accordingly.

Mini Markdown-to-HTML Editor

In this example, a regular expression-based program was created to convert Markdown strings to HTML strings. Using built-in support for text updates, the present techniques can, for example, demarcate a string in the output text with underscores that get pushed back to the Markdown string. Then, after evaluation, the text is italicized due to <em> tags inserted by regular expression transformations. For more advanced functionality, lenses were implemented to translate Markdown headers (#, ##, etc.) to their HTML counterparts (<h1>, <h2>, etc.), translate unordered and ordered list elements (e.g. <li> to either "*A" or "1. A"), and translate <div> and <br> elements to the correct number of newlines.

Additional Examples

The remaining rows in FIG. 4 correspond to: Budgeting is the computation of a budget for which, the result of the expression (income-expenses) is updated to be zero, causes the program update to include all choices for changing the values of lunch, registration, and other expenses. Model-View-Controller demonstrates an interactive page that manipulates the state of the application with buttons and user-defined functions. Mini Linked-Text Editor, wherein users can create links ("variables") between portions of text so that updating any clone updates them all. Translation Doc is a instruction manual in two languages where user can change the language, add and clone translations. Dixit is a scoresheet for the game to ask for bets and compute scores. $L^{A}T_{E}X$ in Html allows the user to modify the output of an editable lightweight $L^{A}T_{E}X$ source file that includes \newcommand, sections, references, labels, and unlimited equations. Interestingly, lenses enable the propagation of reference numbers as an updated reference name, to propagate HTML bold and italic markers to their $L^{A}T_{E}X$ counterparts, and to escape backslashes if they are entered from the output.

Performance of Update Algorithm

Methodology

To validate that the program update algorithm is fast enough to support an interactive direct manipulation workflow, the running time for several benchmarks was measured. Each benchmark in FIG. 4 reflects a summary of the running time of an example program and an interactive editing session. Specifically, the "LOC" column depicts the number of lines of code for the initial program and "Eval" depicts the running time (in milliseconds) averaged over 10 trials. For each example program, a series of direct manipulation edits and program updates were performed, and each editing/update session produced a sequence of all calls to the update algorithm. "#Upd" depicts the number of calls to the program update algorithm during the session.

An offline performance evaluation was performed by replaying the sequence of updates in each session For each call to program update, the time to compute solutions with an unoptimized version of the update algorithm was measured, wherein the unoptimized version ("Unopt") included Optimizations 1 and 2 described above, and a "fully-optimized" version ("Opt"), which also included Optimization 3 regarding edit differences.

Without Optimizations 1 and 2, the algorithm may run out of stack or heap stack on some benchmarks. As noted, each of these calls was performed 10 times, and the running times in the last three columns of FIG. 4 are averages over the 10 trials. The "Slowest Upd" column depicts the (average) running time of the slowest call to update (using the "Opt" algorithm) for the given session, "Fastest Upd" depicts the fastest, and "Average Upd" depicts the (average) running time off all calls in the session.

Results

The data in FIG. 4 suggest three main observations. First, that edit difference optimization is crucial for performance. The "Average Upd" column of the last row are averages across calls to update, as opposed to averages of the rows above. Across all 92 calls to update across all benchmarks, the average running time for the fully-optimized algorithm is 723 ms. Thus, the use of edit differences, rather than plain values, is crucial for making evaluation update feasible in the setting.

Second, that performance of evaluation update is comparable to evaluation. The average evaluation update time (723 ms) is nearly the same as the average evaluation time (833 ms). Because the evaluation update algorithm performs much the same work as evaluation, this suggests that the optimizations described herein achieve most opportunities for speedup. Further gains, both for evaluation and update, are likely to result from optimizing the interpreter—or compiling to "native" JavaScript code—as opposed to additional optimizations of the current approach. In some embodiments, updating the interpreter and/or compiling the code to native JavaScript, or another compiled/intermediate format, may be performed to achieve additional speedups.

Third, there is little ambiguity in the example interactions. Across all 92 calls to update across all benchmarks, the average number of solutions is 1.18. The degree of ambiguity for program repairs is heavily dependent on the programs and interactions under consideration. However, the example programs and interactions demonstrate a variety of useful and realistic scenarios for interactive editing. Together with the data, this suggests that novice and experienced users/programmers alike can develop programs in such a way that direct manipulation edits lead to the desirable repairs without an overwhelming amount of ambiguity.

Example Bidirectional Evaluation with Direct Manipulation Environment

In many embodiments, a user (e.g., a web developer or other programmer, or a nonprogrammer) may want to implement an interactive document, using a programming environment that allows the user to edit the input source code that generates output, and the output directly, using the methods and systems described above. For example, a user may want to create a computer program to generate an HTML table wherein the rows correspond to each of the United States of America, along with the respective capital cities of each State. In general, source code is defined herein to mean the sequence of characters, whitespace, and symbols used to compose a computer program. However, in some embodiments, "source code" may include data, serialized values, complex data objects, images, video files, symbolic expressions, abstract syntax trees, and/or other electronic objects capable of being evaluated by a computer.

Using the present techniques, the user may begin by writing a computer program in a computer language, such as the language described in the above discussion, to generate output. The initial programming effort required to encode all intended data and presentation constraints is similar to when using traditional text-based programming environments. That is, the user may write input source code as she normally would. After writing the input source code, however, in a significant departure from traditional programming activities, the programming environment allows the user to:

1. edit the data and design parameters through direct manipulation of the output; and
2. add elements to the output through a custom, library-defined user interface.

The programming environment may synthesize program repairs based on the user's interactions with the output, thereby obviating/mitigating the need for the user to return to the input source code, and eliminating/reducing the tedious edit-run-view cycle common to traditional programming environments. It should be appreciated that although the following description includes examples of HTML generation, any suitable output format may be used (e.g., JavaScript, SVG, a domain-specific language, a visualization library, etc).

The following includes a description of an example GUI implementation for bidirectional evaluation for programs. The GUI provides a lightweight mechanism for previewing and choosing a solution when there is ambiguity, which may be inherent in some cases while using a general-purpose language. However, it should be appreciated that the present techniques are applicable and may be used in other technical fields and in other programming paradigms/domains. For example, the present techniques may be used for interactive programming when creating applications relating to the trading of financial instruments, to medical data management, to database systems (e.g., relational and key-value store databases), in data science, and so on.

Initial Prototype

FIG. **5*a* depicts a program source code written by a user to generate an initial prototype. The program source code may include string literals (e.g. "California") and strings (e.g. "California"). Lines 1-8 of the program source code in FIG. 5*a*** define the data for an HTML table, states. Each element of states is a three-element list, containing a state name, two-letter abbreviation, and capital city. states may be a list of lists, and it may be partially or completely computed from previous variables.

In the program source code of the initial prototype, the data is incomplete. Unknown abbreviations are marked with question marks (e.g., "AL?" on lines 1-2), whereas undefined capital cities remain empty strings (i.e. " " on lines 4-8). The state of the program source code reflects a common practice of developers, wherein data is left temporarily incomplete while the rendering portion of the program source code, sometimes known as "scaffolding," is written. In FIG. **5*a***, the main definition, starting on line 10, generates the output HTML table.

First, the program source code produces two output columns: one for the state name (e.g., "Alabama"), and one for its respective capital city, concatenated with the state abbreviation (e.g., "Montgomery, Ala."). The headers definition at line 11 contains text for the header row, and the rows definition in lines 12-15 contains the text to display in subsequent rows by mapping each three-element list [state, abbrev, cap] in states to the two-element list [state, cap+", "+abbrev].

The headerRow definition in lines 18-20 uses library functions Html.tr and Html.th to generate table row and header elements, respectively, for the top of the output HTML table. These Html functions take three arguments: a list of HTML style attributes, a list of additional HTML attributes, and a list of HTML child nodes. The Html functions produce encodings of HTML values to be rendered. For example, the headerRow definition may generated an intermediate expression, according to the syntax and semantics discussed above:

```
["tr", [ ], [["th", [["style", [["padding", "3px"]]]],
    [["TEXT", "State"]]], ["th", [["style", [["padding",
    "3px"]]]], [["TEXT", "Capital"]]]]]
```

which may then be translated to the following HTML element:

```
<tr>
  <th style="padding: 3px;">State</th>
  <th style="padding: 3px;">Capital</th>
</tr>
```

The program source code may also include zebra-striping code, for improving the readability of the output. The stateRows definition on lines 22-33 generates the remaining rows of the table. The colors list at line 23 defines two initial colors, "lightgray" and "white". The expression at line 25 chooses one of these colors based on the parity of row index i, as i is received as a parameter from the List.indexedMap library function. The columns definition in lines 26-29 places the text for each state and its capital city—in a two-element list row—inside Html.td elements, which comprise a row built from the Html.tr expression at line 31. For example, for the first row, the columns expression is evaluated and then translated to the following HTML elements:

```
["tr", [ ], [["td", ["style", [ . . . , ["background-color",
    "lightgray"]]]], [["TEXT", "Alabama"]]],
  ["td", [["style", [ . . . , ["background-color", "lightg-
    ray"]]]], [["TEXT", "? AL?"]]]]]
["tr", [ ], [["td", [["style", [ . . . , ["background-color",
    "white"]]]], [["TEXT", "Alaska"]]],
  ["td", [["style", [ . . . , ["background-color",
    "white"]]]], [["TEXT", "? AK?"]]]]]
```

These nested lists are translated to the HTML elements:

```
<tr>
  <td style="padding: 3px; background-color: lightgray;
    ">Alabama</th>
  <td style="padding: 3px; background-color: lightgray;
    ">Montgomery, Ala.?</th>
</tr>
<tr>
  <td style="padding: 3px; background-color: white;
    ">Alaska</th>
  <td style="padding: 3px; background-color: white;
    ">Juneau, Ak.?</th>
</tr>
```

Lastly, the expression at line 35 builds the overall Html.table element comprising headerRows and stateRows. The output program source code value is translated to HTML and rendered graphically in the right half of the programming environment, as depicted in FIG. 5*a*. Although the example depicted includes HTML output, and rendering in a particular region of a GUI, the output may be of another form (e.g., Markdown), and may be rendered in any suitable location, including in a file, or via a network to a remote computing device.

Direct Manipulation of Output Text

In some embodiments, a user who has encoded the intended programmatic relationships for a data set and an output design of that data set may next want to correct the missing data (e.g., the data missing from lines 2-8 of FIG. 5*a*). As noted above, in a significant departure from typical programming practices, the present techniques allow programming environments to be created which allow the user to edit text directly in the graphical user interface that displays the output (the right half of the editor).

Computing and Displaying Program Updates

In some embodiments, a user may interact with the output to produce changes to the program source code, and the user may be provided with an indication of what the resulting changes are. For example, FIG. 5*b* depicts an example of how a user may edit the data in the program source code depicted in FIG. 5*a* through the graphical user interface, including a depiction the program environment state after the following sequence of user actions.

First, in the first state row of the output table, the user deletes the question mark after "AL" in the string ", AL?". Next, in the second row, the user replaces the string "AL?" with "AK". As soon as the user begins editing the output table (or due to a user's explicit selection, in some embodiments), the programming environment may detect that the program output is no longer synchronized with the program. As a result, the programming environment highlights the source code input box on the left side of the programming environment with a red border and displays a pop-up window including a menu item labeled Update Program.

When the user hovers over Update Program, the programming environment runs an evaluation update algorithm to synthesize a repaired program that, when re-evaluated, generates the same result as the directly manipulated output. The update algorithm may proceed according to the principles described above. In the depicted embodiment, the algorithm computes one solution that, along with an option for reverting the changes, is displayed in a nested graphical user interface menu to the right of Update Program. It should be appreciated that the graphical user interface aspects of the present techniques may be implemented using any suitable software development environment (e.g., using a desktop software development kit, a mobile software development kit, via web programming frameworks/libraries, etc.). A text-only output encoding may also be targeted, such as curses.

Figure 5B:
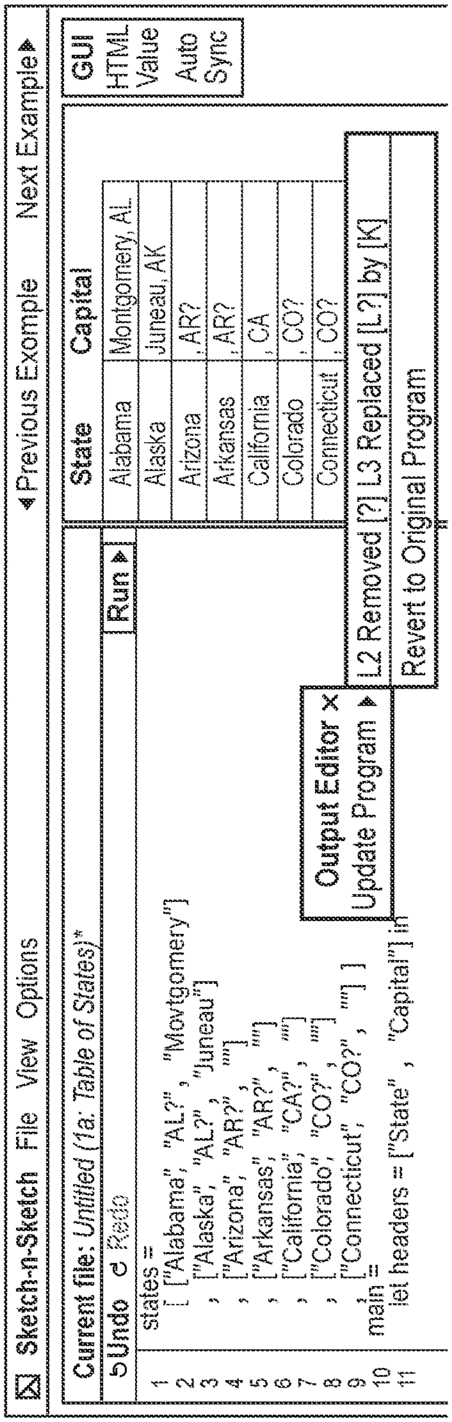
FIG. 5*b* depicts the programming environment of FIG. 5*a*, further including a popup window including a result of reconciling a user's edits to the rendering of HTML output generated by the computer program source code with the computer program source code.

FIG. 5*b* captures the editor state when the user hovers over the first item in the nested menu, at which point the programming environment displays a preview of the updated program (resp. output) directly in the left (resp. right) pane. The caption "L2 Removed [?] L3 Replaced [L?] by [k]"

summarizes the string differences, in lines 2 and 3, between the original and updated program text. These string differences are highlighted in red and orange in the code box to further help communicate the proposed changes to the user. In this case, the new program matches the user's expectations, so the user clicks the menu item (not shown in the screenshot) to confirm the update, returning the program and output to a synchronized state.

In general, it should be appreciated that any suitable means of communicating differences to users may be used, and that the user's confirmation and/or rejection of the changes may be received/collected via any suitable means (e.g., the click of a mouse, a press of a touch screen, etc.). Having the ability to accept a user indication before making a change to the program source code is an important facility, because edits to the output may lead to ambiguous changes, with respect to the original source code. In some embodiments, a first display and a second display of a user may be different physical devices, or a single physical device of a user. For example, the user may have a desktop with multi-head computer monitors, or a single computer monitor. Original program source code and/or program output may be displayed in any display of the user. Updated program source code and modified program output may be displayed in any display of the user. In some embodiments the first display of the user and the second display of the user are the same device.

Ambiguity

Figure 5C:
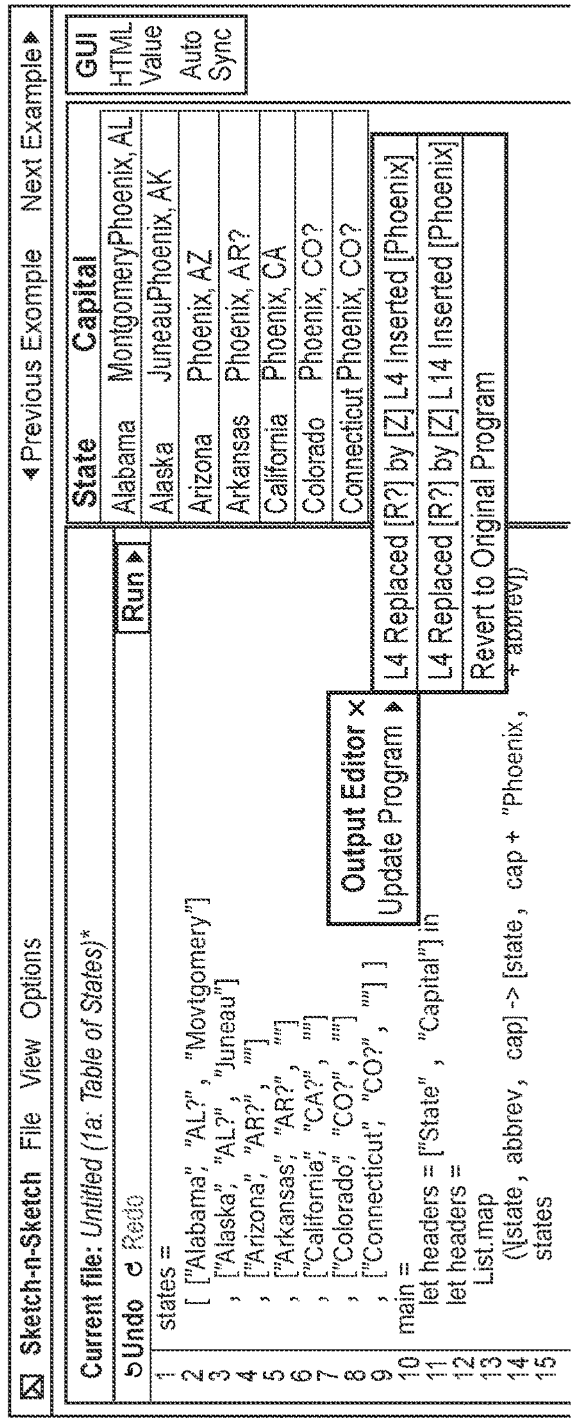
FIG. 5*c* depicts the computer programming environment of FIG. 5*b*, further including a popup window including a result of reconciling a user's edits to the rendering of HTML output generated by the computer program source code with the computer program source code, wherein the edits resulted in ambiguity.

FIG. 5*c* depicts a change that leads to plural/ambiguous solutions. For example, in the third row, the user replaces ", AR?" with "Phoenix, Ariz.". The change causes the Update Program menu to be displayed, and when the user hovers over the menu, two solutions are caused to be displayed, in addition to the option to revert the changes. FIG. 5*c* captures the editor state when the second solution is hovered. In the example, both solutions are valid because each replaces "AR?" on line 4 with "AZ", as desired, but the second solution inserts "Phoenix" as a prefix to the "," separator string used in the concatenation on line 14.

By viewing the preview of the output, with "Phoenix" appearing in all rows, the user quickly determines that this change, though consistent with the output edit, is undesirable. In this way, the menu with previews represents a lightweight yet efficient way for the user to disambiguate between multiple valid updates. The user then hovers over the menu and selects the first option (not shown in the screenshot).

The present techniques facilitate the avoidance of ambiguity. For example, the user may edit the input source code to wrap the string " ", " " in a call to Update.freeze (not shown), which instructs the programming environment never to change this expression when computing program updates. In this way, the separator string at line 14 will remain constant. The user may fill in missing data for the remaining rows directly in the output pane. Having frozen the separator string already, none of these changes lead to ambiguity. In some embodiments, additional freeze operators may be introduced. For example, Update.expressionFreeze may not prevent a new value from being pushed back to an expression, and may ensure that the expression stays the same and that only the variables' values may change. Update.freezeLeft and Update.freezeRight may prevent insertions to, respectively, the beginning and end of output strings.

Browser Conveniences for Navigating Output Text

During the foregoing interactions in the programming environment, the user benefits from text-editing features built-in to the browser—using the Tab key to advance to subsequent columns and rows, and arrow keys to navigate the text cursor within the selected cell—which make it yet more convenient to specify these changes in the graphical user interface rather than in the source code editor.

Programming Environment: Direct Manipulation Programming for HTML

The last major aspect of the programming environment is the user interface for updating output values and interacting with the program update algorithm. Below, several different direct manipulation value editors are described. Regardless of which value editor is used to make changes, the connection to the update algorithm may proceed as described in "Computing and Displaying Program Updates," "Ambiguity," and "Automatic Synchronization".

Multiple types of user interfaces may be implemented for manipulating output, depending on the embodiment. The first mode is a Graphical User Interface, which allows the user to make edits directly in the HTML-rendered output. Some embodiments support text-based editing. For example, in a translation of HTML text nodes, a "contenteditable" attribute may be added to allow changes to the text. In some embodiments, key events (e.g., keypress events) are received and processed. For example, Ctrl+B may cause an update to bold text. In some embodiments, direct manipulation widgets for common properties of other kinds of elements, such as color, position, size, padding, etc. are available. A second mode includes a Text Interface, which allows the user to make edits to the output value rendered as a string. The text interface allows the string to be rendered either as "raw" HTML or in the syntax described above. The final mode integrates with the built-in DOM Inspector provided by modern web browsers. The features provided by the browser allow users to, for example, select DOM elements—either by right-clicking or by navigating in a separate view of the DOM tree—and then use built-in text- and GUI-based panels for adding, removing, and editing elements and their attributes.

Direct Manipulation with DOM Inspector

Continuing with the above example, having corrected the data in the table, the user may next wish to experiment with different styles. The direct manipulation output pane in the depicted programming environment embodiment provides direct manipulation only for text content (as in the interactions above). However, it should be appreciated that some embodiments allow the developer to use the existing Developer Tools provided by modern browsers for inspecting and modifying arbitrary elements and attributes in the DOM (i.e. the HTML output of the program). In an embodiment, changes to the DOM may be used to trigger the program update algorithm.

Browser Conveniences for Editing Styles

Figure 5D:
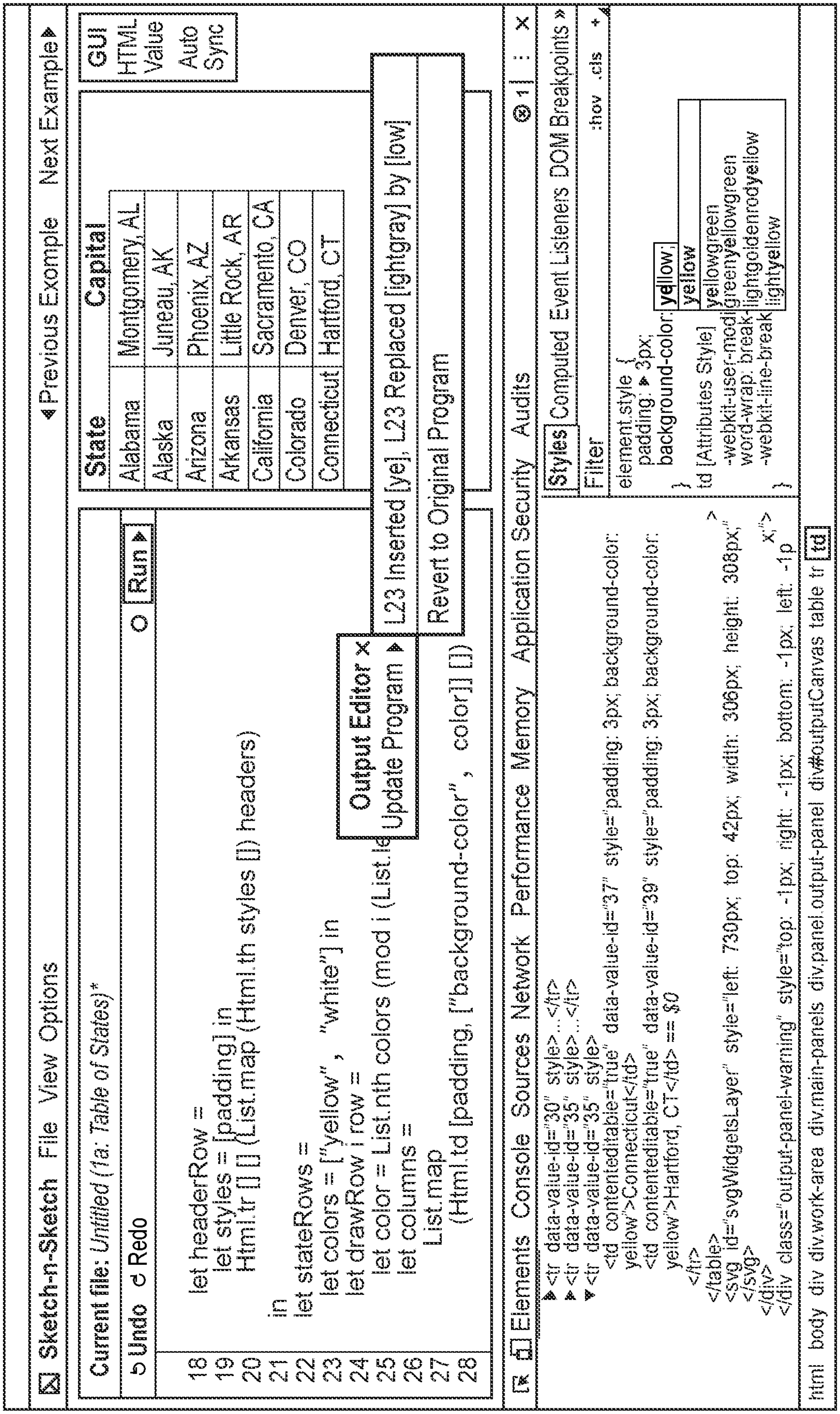
FIG. 5*d* depicts a computer programming environment for allowing a user to modify the program output using built-in tools of a web browser, according to an embodiment.

Built-in browser functionality may have synergies with the programming environment. For example, a user wants to try out different colors for alternating rows, to replace the colors at line 23 in FIG. 5*a*. FIG. 5*d* depicts an example of affecting such changes in the programming environment. First, the user may right-click the "Hartford, Conn." cell and select Inspect from the browser's pop-up menu. Of course, the precise mechanism by which the user accesses a developer tools panel may vary from browser to browser. As a result, a Developer Tools pane appears at the bottom of editor (as depicted), with the selected cell in focus in the DOM Element Inspector. The rightmost panel may provide a Styles Editor, which the developer can use to change the background-color from the initial lightgray color, by adding, editing, and/or removing properties in the Cascading Style Sheet (CSS) of the HTML document in the right hand side of the programming environment.

The user may open the DOM inspector and select one of the cells colored "lightgray" cells in the table (using the Inspect panel in Firefox browser or the Elements panel in Chrome browser, or by right-clicking directly on the output element in the right half of the programming environment). A side panel in the browser Developer Tools pane lists all of the style attributes for that cell, one of which is the background-color: lightgray property generated by the program. The user starts typing ye and, then, using the built-in conveniences provided by the Styles Editor for changing color values (e.g., a dropdown menu of related colors, equipped with tab completion and previews) decides to try the color yellow.

As with the text changes described above, the programming environment may detect that the output is no longer synchronized with the program source code, and based on the detection, may trigger the update algorithm, and displays the Update Program menu. FIG. 5*d* captures the editor state as the user hovers over the single solution, which replaces "lightgray" at line 23 with "yellow" to reconcile the change. In the output of the updated program source code, the color of all cells in alternating rows are changed (not only the one cell directly manipulated). Notably, the present technique has allowed the user to modify both the source code of the program, and other rendered output parts of the source code, without directly interacting with either.

Automatic Synchronization

In some embodiments, the programming environment may facilitate automatic synchronization between the program source code and the rendered output without the user needing to confirm the updates. For example, the user may want to experiment with colors, but manually hovering and clicking the Update Program menu will be tedious when trying several options. So, the developer may click the button labeled Auto Sync in the right toolbar, which toggles the editor into a mode that performs automatic updates. Specifically, whenever the output is changed—either directly in the graphical user interface and/or through the DOM Inspector—the program update algorithm is automatically run after a configurable delay (e.g., 100 ms). When there is a single solution, it is applied automatically, without requiring the user to hover and select the update through the menu.

Thus, the developer can try several colors in the DOM Inspector in rapid fashion, viewing how the change propagates immediately to the entire table.

Small Updates

As noted above, the user can add HTML elements/attributes via the DOM. For example, to continue with the above example, the user may wish to add a background color to headerRow, whose styles list on line 19 does not include a color.

Figure 5E:
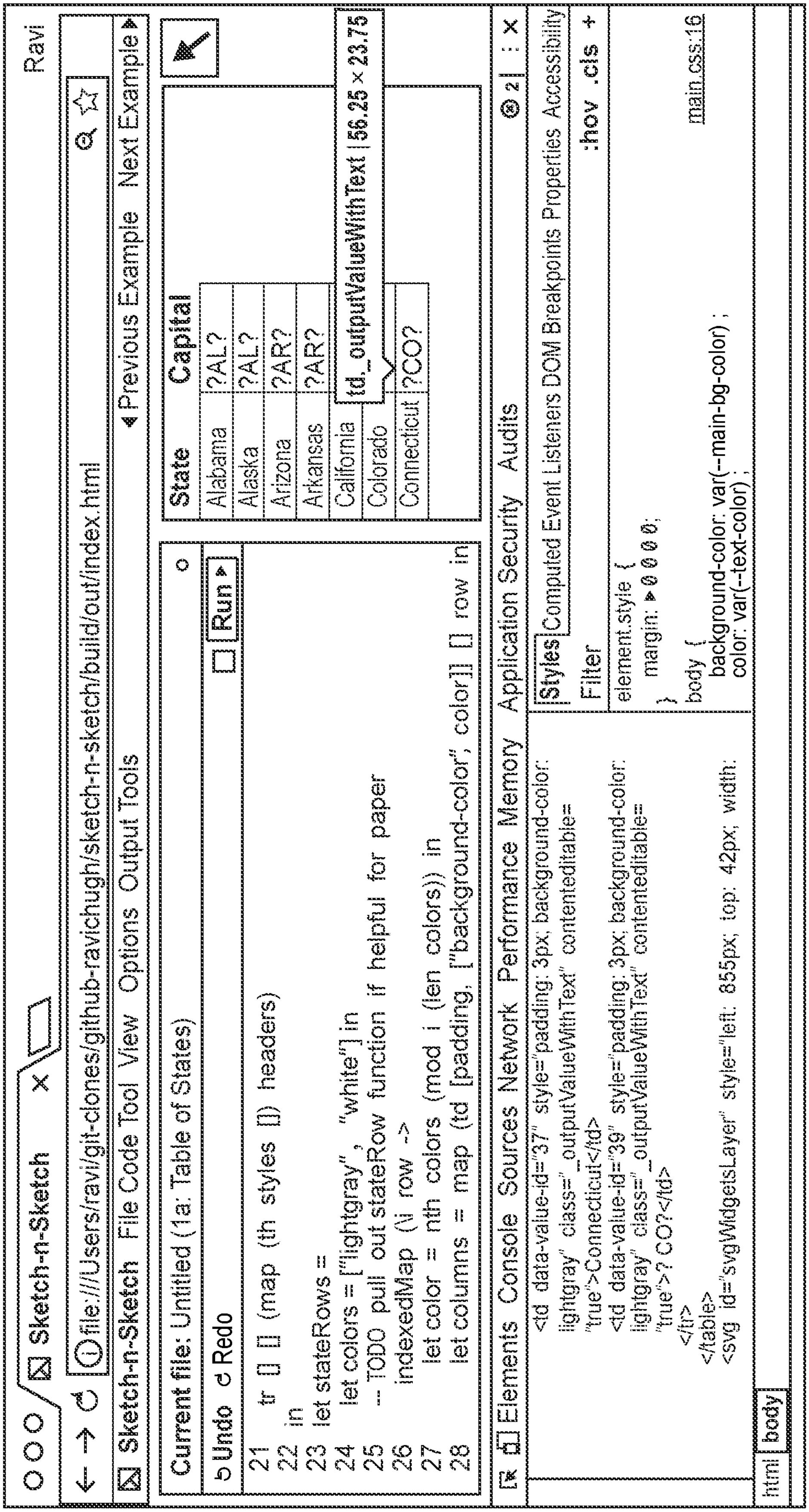
FIG. 5*e* depicts a computer programming environment wherein the user directly edits the Document Object Model (DOM) of an HTML document output in the programming environment.
Figure 5F:
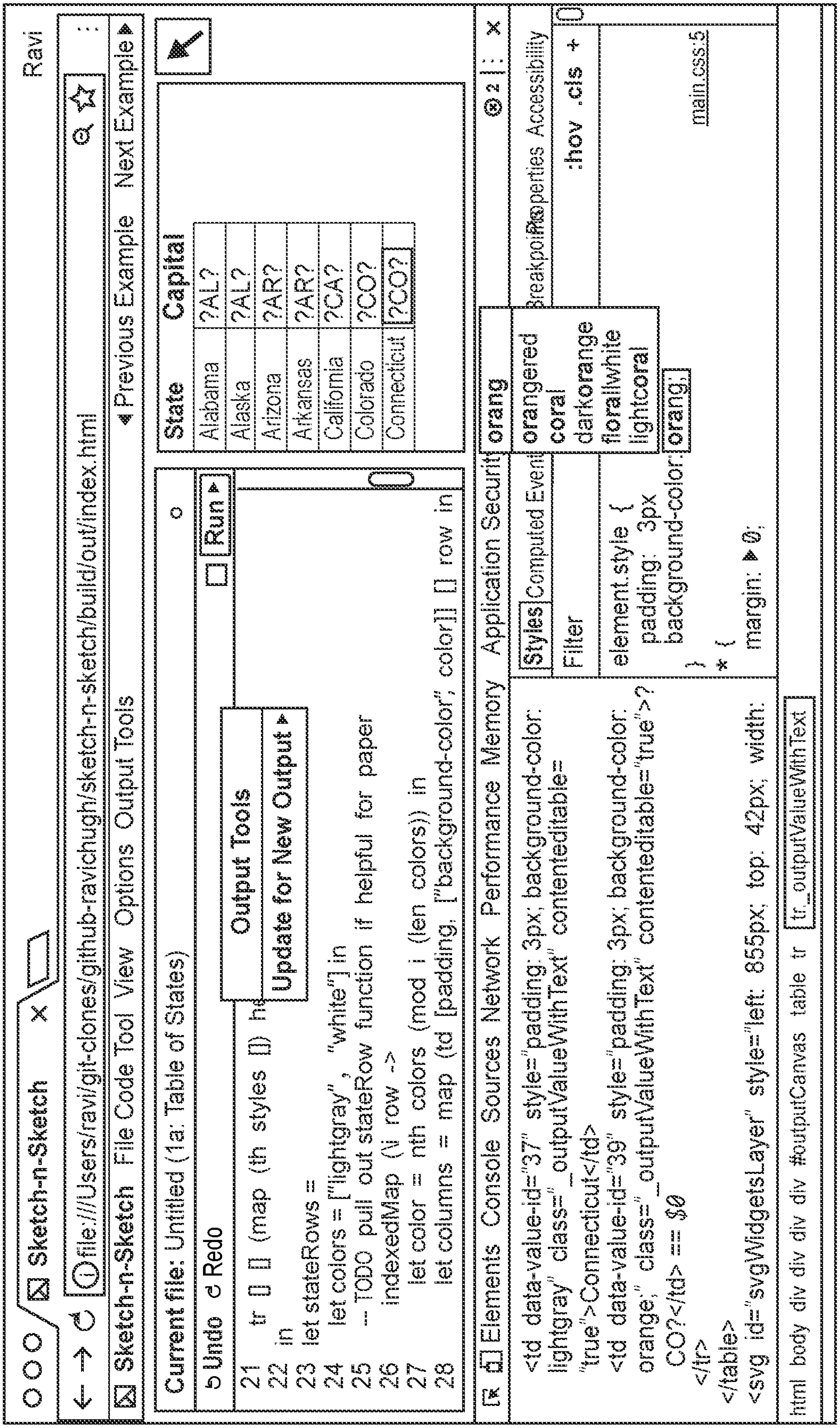
FIG. 5*f* depicts the computer programming environment of FIG. 5*e*, wherein the user uses a styles editor of a web browser to add a new attribute directly to DOM.
Figure 5G:
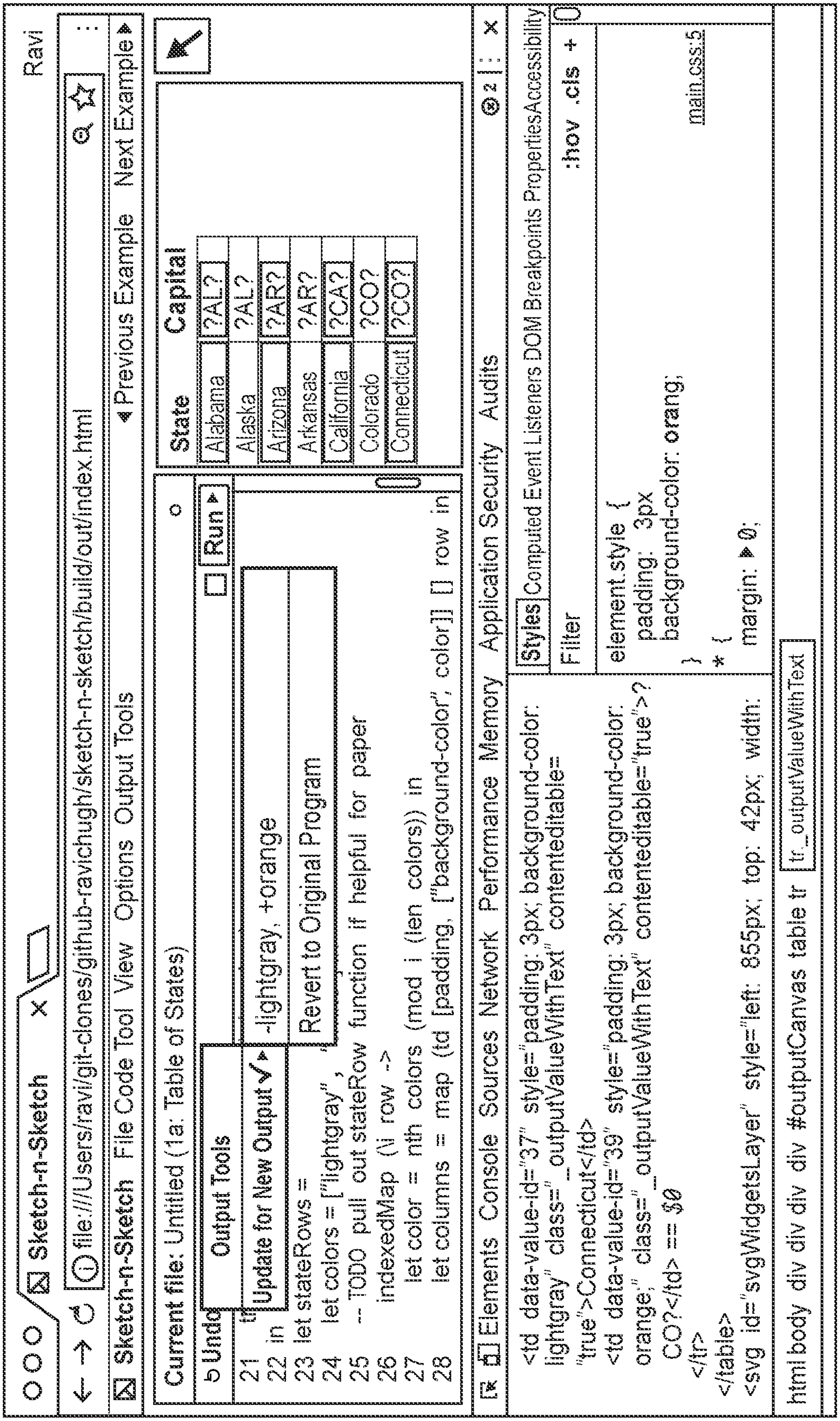
FIG. 5*g* depicts the computer programming environment of FIG. 5*f*, wherein updated output is displayed and the user is provided with a graphical user interface element depicting the evaluated changes and an option to revert the changes.

FIG. 5*e* depicts a menu displayed when the user selects a td element. After selecting the first column of the header row in the browser DOM Inspector (either by right-clicking, or using the browser's built-in Inspect cursor), the user, again, uses the Styles Editor, as depicted in FIG. 5*f*. The Styles Editor provides an easy way (with a mouse click or Enter key press) to add a new attribute. The user adds a new background-color attribute set to the value orange, as depicted in FIG. 5*f*, and the corresponding program update adds the pair ["background-color", "orange" ] to the styles list on line 19. The resulting updated output HTML and menu showing the changes and option the user to revert the changes are depicted in FIG. 5*g*.

Therefore, unlike the local updates described above, wherein constant literals in the program source code were replaced with new ones, the user has succeeded in performing a structural update, which alters the structure of the abstract syntax tree. Specifically, the user has added a "background-color" to the DOM, where none previously existed. Some embodiments may transcend local and pretty local updates. Using lenses and pushing back closures, the entire function body may be changed to, for example, replace a function *ƒ* with another function *ƒ*'. An API may be exposed for editing the closure, which may allow the user to develop tools to customize the body of the functions.

As described above with respect to FIG. 2*c*, such structural updates are referred to pretty local because the only change to the structure is inserting a new literal at a leaf of the AST (i.e., inside another list literal). The program update algorithm in the programming environment may produce only local and pretty local changes to the program, a restriction that nevertheless results in a useful set of "small" changes to the original program.

Direct Manipulation with Custom User Interfaces

Throughout the direct manipulation interaction examples described thus far, the user has leveraged GUI features provided by the programming environment and/or existing browsers to edit the content and styles of existing rows in the table. It should be appreciated that performing tasks that are not provided by the programming environment and/or another environment (e.g., a web browser), are also supported by the present techniques. For example, a row with columns "Delaware" and "Dover, Del." may be added to the bottom of the output HTML table. Programmatically, this change corresponds to adding a new three-element list ["Delaware", "DE", "Dover"] to the end of the states list.

The developer could directly manipulate the output HTML by copying the last <tr> to a new row, and changing the content of the row. However, as described above, the program update algorithm cannot reconcile such changes with the original program, because such a reconciliation so would require simultaneous reasoning about inserting elements into lists (in this example, states) that are being destroyed (in this example, by List.map) and whose elements are being transformed by some function (in this case, the anonymous function on line 14 of FIG. 5*i*). In an embodiment, the programming environment includes logic for detecting changes that modify the library, and providing the user with an error message explaining that such changes are not permitted.

User-Defined Program Updates with Lenses

When the built-in program update algorithm does not facilitate the direct manipulation interactions desired for a particular task, the programming environment provides users (or library writers) with the ability to define a custom lens that augments a "bare" function with a second update function that defines the "reverse semantics" for the bare function. For example, to continue the above example, the user can use lenses to define a module called TableWithButtons—which performs more advanced evaluation update than for basic List.map—to serve as a drop-in replacement for the basic table-constructing functions in the Html library. FIG. 5*h* depicts an upgraded code library implementing the TableWithButtons, according to an embodiment.

Figures 5I, 5J:
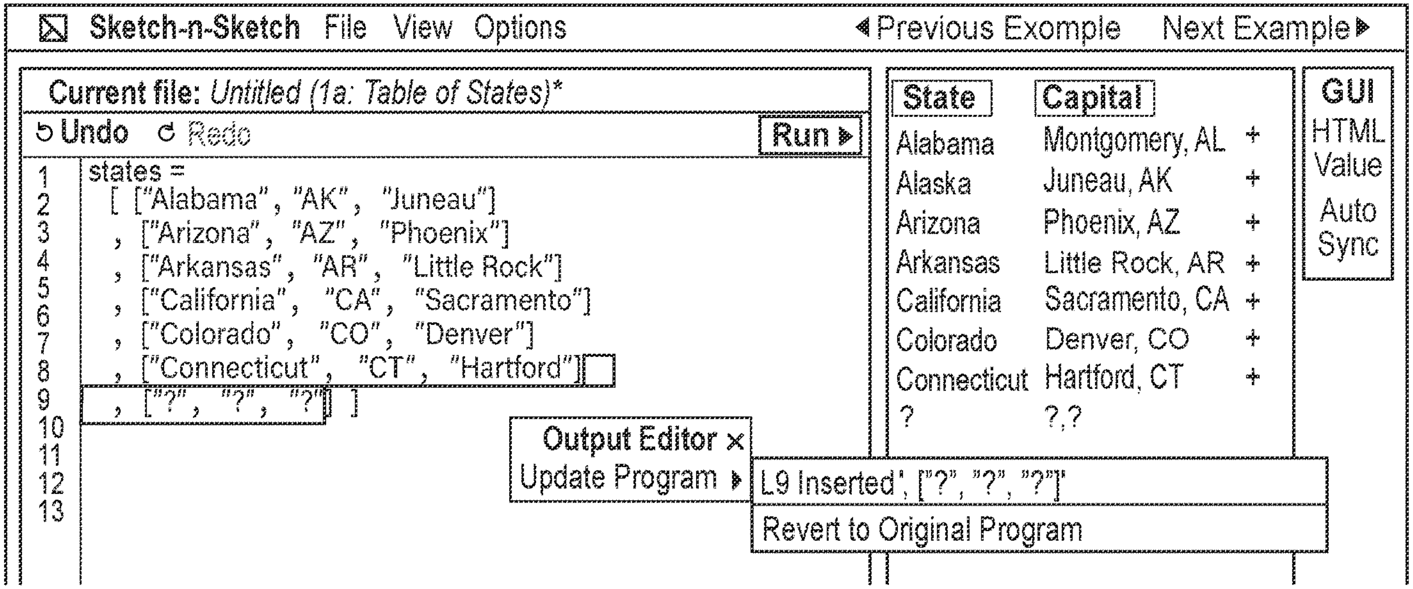
FIG. 5*i* depicts a computer programming environment wherein a code library includes a graphical user interface element in the output display which allows the user to add a structural element by interacting with the graphical user interface element.
FIG. 5*j* depicts an HTML module providing helper functions for creating HTML elements, according to an embodiment.

FIG. 5*i* depicts a graphical example, using the more sophisticated code library, of clicking a button (labeled "+") causing a new row to be added at the clicked position. For example, assume that the user clicks the button next to the "Connecticut" row, hovers Update Program, and then hovers the single solution (as shown in the screenshot). Based on this series of interactions, the resulting program adds a placeholder/blank row at line 9 in the states list, which can later be filled in through the basic direct manipulation text interactions as before. Thus, by using lenses to augment the functionality of the built-in program update algorithm, users and library writers can implement custom user interface features for manipulating the particular bidirectional functional documents under construction. Of course, it should be appreciated that structural elements other than HTML table rows may be added. In some embodiments, the added elements may be other than HTML elements (e.g., any suitable complex data objects). The types of structural elements that may be added, edited, and removed are often determined by the which datatypes form the currency of a particular programming environment.

Library Design for HTML Programming

The main definition of a program may compute an HTML value, using a list-based encoding of HTML elements. A text element may be represented by a two-element list ["TEXT", s] and a non-text element by a three-element list [tag, attributes, children], where tag is an HTML tag (e.g. "div", "span", "h1", etc.), attributes is a list of string-value pairs (rather, two-element lists), and children is a list of HTML elements. In some embodiments, a list-based encoding that includes explicit datatypes may be used, in addition to a small Html library to make programming with this encoding more convenient.

Co-Design for Pretty Local Updates

FIG. **5*j* depicts a Html module that provides helper functions for several common tags. These functions may take a number of arguments. For example, three arguments may be provided: a list of HTML "style" attributes, a list of non-style attributes, and a list of children. The Html library functions are used, above, in Lines 20, 28, 31, and 35 of FIG. 5*a*** depict example calls to Html. The choice to provide style and non-style attributes separately is for clarity—to avoid having the "style" attribute list be nested within another list. However, the choice may be altered in some embodiments. The choice for the "default" library functions to take attribute lists as arguments—even when they are empty—is to facilitate the addition of styles during subsequent direct manipulation interactions. But in some embodiments, this behavior may be modified. In general, calling library functions with literal arguments is a convention that is established to provide an update algorithm with a place in the user program, as opposed to the library implementing the update, to add or remove attributes. This convention may be useful in some embodiments wherein an update algorithm makes structural changes to list literals, as discussed above with respect to pretty local updates.

Additional and Alternate Embodiments

In some embodiments, a hybrid, demand-driven approach may used, for large programs where both time and memory are limited resources, wherein the time and space/memory tradeoffs are configurable. In particular, the initial evaluation of a program could proceed without traces, resorting to evaluation update when output values are changed. Then, when re-evaluating parts of the program to reconcile the changes, evaluation could record traces with the expectation that values for those expressions are more likely to be changed again. The subsequent interactions could then use trace information (and constraint solving) where available to avoid re-evaluation. A benefit to incorporating traces and constraint solving is to enable more precise reasoning than, for example, the "top-down" approach to inverting arithmetic operations described with respect to FIG. **2*b***.

The methods and systems described herein include two distinct notions of "bidirectionality." First, all programs are reversed in a general-purpose language, wherein the techniques in fact, reverse the language interpreter. That is, in bidirectional evaluation, arbitrary programs in a general-purpose functional language may be evaluated "in reverse," by synthesizing program repairs based on differences between original and desired output values. The practicality of this approach is demonstrated by the programming environment discussed above, which represents a new direct manipulation programming system used to develop a variety of HTML documents and applications that can be interactively edited because of bidirectional evaluation.

Second, the creation of defined lenses for customizing the behavior of the "backwards interpreter" is facilitated. Unlike prior work on lenses, and other mechanisms for bidirectional transformations, the present techniques enable users to write arbitrary pairs of (well-typed) apply and update functions, wherein the latter are "hooks" to customize the update algorithm. In contrast to past approaches, a fundamental goal for the lenses work is to ensure that the pair of functions satisfies various roundtrip laws.

The present techniques allow edits to the output of arbitrary programs, and such modifications must be supported, because they arise frequently in the presence of ambiguity (e.g., in determining whether a change should be propagated to the function or data) and concurrent edits (e.g., one user changes a function, an other changes the data). Given the flexibility enabled by arbitrary functions, a reversible list map can be defined which backpropagates changes to the list elements as well as the function itself. The evaluation update algorithm can, itself, be "lifted" to user-defined functions and data structures by exposing its operations in an Application Programming Interface (API).

This API to define lenses relates to matching lenses, in which lenses are parameterized over a choice for how to align subsets of data in the input and output domains. However, in the present techniques, the built-in update algorithm may use a Diff operation based on a single heuristic, and this operation is exposed to user-defined lenses through the diff primitive. In some embodiments, some prior art approaches to lenses may be integrated into the present bidirectional evaluation scheme, to provide mechanisms for varying degrees of reasoning principles and interaction paradigms, as needed according to various embodiments.

In an embodiment, evaluation update may reason about control-flow choices in order to prune solutions that would deviate from them, which would enable a stronger correctness property in situations that require it. In another embodiment, bidirectional evaluation may be integrated with, for example, type-directed program synthesis to synthesize "larger" kinds of repairs. In still other embodiments, exposing expression and value abstract syntax trees entirely to user-defined update functions (i.e. quote and unquote) may enable more expressive metaprogramming mechanisms to customize bidirectional evaluation. Finally, more full-featured direct manipulation programming systems—for HTML as well as other domains—may further help to break free from the edit-view-run cycle of traditional programming environments.

The examples and results above demonstrate that the present techniques enable many useful direct manipulation programming interactions. Nevertheless, there are several technical and engineering limitations that are addressed in particular embodiments. For example, a single heuristic is used for implementing the Diff operator, in some embodiments. Given a list [a,b], if b is updated to b' and then c is inserted at the beginning like [a,c,b'], the Diff algorithm aligns lists and end up concluding that b was updated to c and that b' was inserted at the end. In other embodiments, alternative alignment algorithms may be used.

Furthermore, nested differences are not supported by Diff in some embodiments. For example, if [x, y, z] is updated to Ex, ["b", [ ], [y], z], some embodiments may fail (possibly with an ungraceful exception) because it is assumed that the expression which produced y should be updated with ["b", [ ], [y]], when in fact, that expression should be updated based on y and then propagated upwards. However, in other embodiments, alternative nested difference algorithms may be used.

In practical engineering terms, there are situations in which a DOM listener becomes unsynchronized with the editor state, and the editor cannot reason about larger structural changes to the DOM. These limitations have the potential to affect the usability of some current programming environment implementations, and may require changes to upstream codebases. In general, such issues are not fundamental to the techniques described herein, but are symptomatic of bugs in other systems.

Example Bidirectional Evaluation Computing Environment

Figure 6:
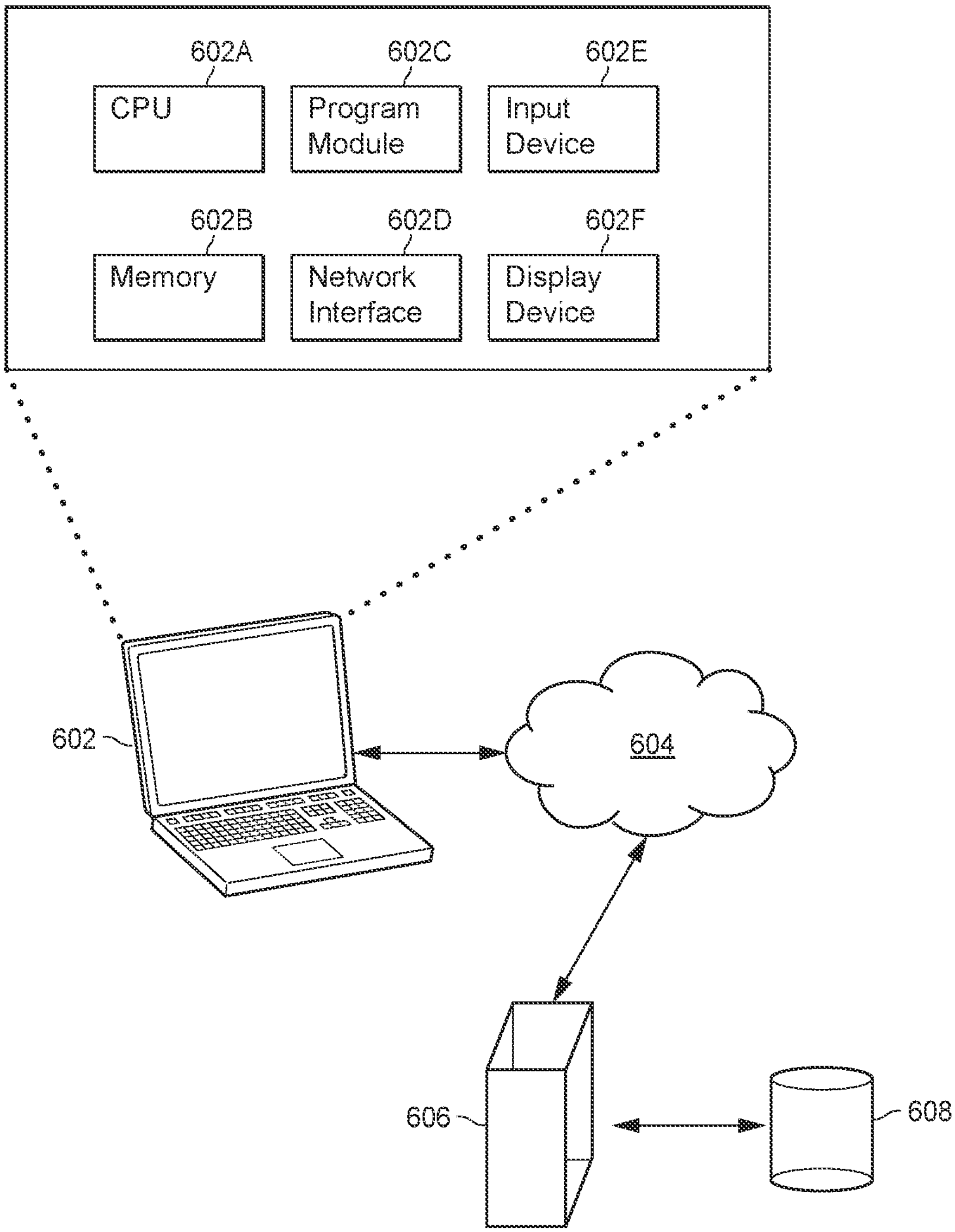
FIG. 6 depicts a system diagram for implementing the present techniques, according to some embodiments and scenarios.

FIG. 6 depicts various aspects of a computing system 600 for facilitating bidirectional program evaluation, in accordance with some embodiments. The high-level architecture of the computing system 600 includes both hardware and software components, as well as various channels for communicating data between the hardware and software components. The computing system 600 may include hardware and software modules that perform methods of bidirectional program evaluation for purposes of facilitating user programming (e.g., for creating HTML documents). The modules may be implemented as computer-readable storage memories containing computer-readable instructions (i.e., software) for execution by a processor of the computing system 600.

The computing system 600 may include a client computing device 602, a computer network 604, a remote computing device 606, and a database 608. The client computing device 602 may include a personal computer, smart phone, laptop, tablet, or other suitable computing device. The client computing device 602 may include various hardware components, such a central processing unit (CPU) 602A, a memory 602B, a program module 602C, a network interface controller 602D, an input device 602E, and a display device 602F. The CPU 602A may include any number of processors, including one or more graphics processing unit (GPU). The memory 602B may include a random-access memory (RAM), a read-only memory (ROM), a hard disk drive (HDD), a magnetic storage, a flash memory, a solid-state drive (SSD), and/or one or more other suitable types of volatile or non-volatile memory. The memory 602B may store, or contain, one or more program module 602C. The program module 602C may be one or more computer programs, including computer-readable instructions. The computer-readable instructions may be stored as program source code, and may correspond to the program source code depicted in lines 1-35 of FIG. 5*a* and lines 18-28 of FIG. 5*d*, for example. The computer-readable instructions may also correspond to the output of such program source code, such as the table of states and respective capital cities depicted in FIG. 5*a*.

The program module 602C may contain a separate set of instructions that, when executed, cause a graphical user interface such as the one in the programming environment of FIG. 5*a* to be rendered, such that the user can interactively modify the program source code and/or the output corresponding to the program source code, and view as changes to either are propagated in both directions during bidirectional evaluation as described above. The graphical user interface of the programming environment may include facilities for opening files, saving files, and editing existing files. The graphical user interface may also include buttons or other user interface widgets for accessing certain functionality with respect to the programming environment, such as toggling Auto Synchronization, as discussed above. The program module 602C may, in some cases, include instructions for monitoring the status of a DOM associated with the programming environment, and for responding to changes based on detecting events during the monitoring. Computer-readable instructions stored in the program module 602C may, when executed, cause information to be sent, received and/or retrieved via the network interface controller 602D.

The network interface controller 602D may include one or more physical networking devices (e.g., an Ethernet device, a wireless network controller, etc.). The network interface controller 602D may allow the client computing device 602 to communicate with other components of the computing system 600 via a computer network such as the computer network 604. The input device input device 602E may include one or more peripheral device such as a detached keyboard or mouse, or an integral device such as a capacitive touch screen of a portable computing device. The input device 602E may include a microphone, in some embodiments. The display device 602F may include one or more suitable display, such as a computer screen, monitor, capacitive touch screen, television screen, etc.

In some embodiments, the client computing device 602 may connect to other components via a computer network such as the computer network 604. The computer network 604 may include any suitable arrangement of wired and/or wireless network(s). The computer network 604 may include public and/or private networks (e.g., the Internet and/or a corporate network). In some embodiments, the computer network 604 may include a local area network (LAN), wide area network (WAN), metropolitan area network (MAN), virtual private network (VPN), etc. The client computing device 602 may connect to any other component of the computing system 600 via the computer network 604.

The other components of the computing system 600 may include one or more remote computing device 606. The remote computing device 606 may be implemented as one or more hardware devices, and may be a backend component of the computing system 600. The remote computing device 606 may include various hardware components, such as a CPU, a memory, a NIC, an input device, and/or an output device (not depicted FIG. 6). The CPU may include any number of processors, possibly including one or more GPUs. The memory may include a RAM, a ROM, an HDD, a magnetic storage, a flash memory, an SSD, and/or one or more other suitable types of volatile and/or non-volatile memory (not depicted FIG. 6). The NIC may include one or more physical networking devices (e.g., an Ethernet device, a wireless network adapter, etc.). The NIC may allow the remote computing device 606 to communicate with other services in computing system 600 by sending, receiving, and/or retrieving data via the computer network 604. A user of the computing system 600 may interface with the remote computing device 606 via the input device and/or display device of the remote computing device 606.

The remote computing device 606 may include one or more modules implemented as hardware and/or computer-readable instructions (e.g., software). For example, the remote computing device 606 may include an evaluation module for performing bidirectional evaluation of computer code. In some embodiments, a evaluation module may also, or alternatively, be located in the program module 602C of the client computing device 602. The evaluation module may include instructions for receiving a program source code, evaluating the program source code to generate an output, transmitting and/or displaying the output, receiving an edit to the output, evaluating the output to generate an updated program source code, and transmitting the program source code to and other component of the computing system 600 (e.g., to the client computing device 602). Of course, depending on the embodiment, the foregoing actions may occur completely in the client computing device 602. An advantage of using the remote computing device 606 may be that the remote computing device 606 includes more powerful computational and/or space capabilities than the client computing device 602, and may this provide more responsiveness.

The remote computing device 606 may include a database 608, which may include a relational database, key-value data storage system, or other suitable storage device/system. The database 608 may be used to store program source code, modules, and/or lenses. The database 608 may be used by the bidirectional evaluation update algorithms for intermediate storage, and for saving logs of programs. For example, in an embodiment, every change to a program source code and/or its output through the bidirectional evaluation update algorithm may cause a copy of both the original program, the output of the original program, the delta in the updated program source code (e.g., the code that was changed), and the updated output to be stored in the database 608. In this way, the user could later replay the changes that were made to the program source code and its output over time. In an embodiment, the database 608 may correspond to a source code management application (e.g., a Git repository). The database 608 may also be used to contain lenses and/or modules authored by users that are used in conjunction with the update operations described above.

In operation, a user (e.g., a computer programmer) may want to write some source code to produce and output. In some embodiments, the user may want to edit existing source code. In some other embodiments, the user may want to edit the output of existing source code directly, rather than editing the source code. The user may begin by opening an application in the client computing device 602. The application correspond to the programming environment depicted in, for example, FIG. 5*a*. As discussed above, the user may begin by opening a saved file, or creating a new file. The file may already include programming instructions (e.g., program source code), to which the user may contribute additional instructions. The user may then execute the program source code by interacting with the programming environment. For example, the user may press or click a "Run" button with a computer mouse, or press a series of keys on a keyboard to cause the instructions to be evaluated in a forward direction.

In some embodiments, forward evaluation may include a compilation step. The evaluation may cause output to be displayed, corresponding, in some embodiments, to the evaluation of program source code written in syntax provided herein, to generate an HTML output as described with respect to FIG. 5*a* et seq. The output may then be displayed in the programming environment.

Next, the user may modify the output directly, either by direct interaction with the output as displayed in the programming environment, and/or via a DOM editor. The modification may include edits to textual information, as well as the addition of new structural elements. The type of structural elements that are permitted to be added may be governed by modules that the user has created and/or loaded in the programming environment, which may included lenses. For example, the user may use the TableWithButtons module to allow additional table row elements to be added, as described with respect to FIG. 5*h*. In some embodiments, such modules may be stored in the program module 602C of client computing device 602, or in a storage module of remote computing device 606. The client computing device 602 may retrieve modules for use in the programming environment.

Once the output has been modified by the user, the programming environment may immediately detect that a change has been made, and may execute a reverse update algorithm, as described above, to determine how the program source code must be modified in order to match, or produce, the modified output. As discussed, in some embodiments, the reconciliation process may run automatically, either at an interval, or based upon the occurrence of an event (e.g., a click event). If the update results in one updated program source code, then the updated program source code may be displayed in the programming environment (e.g., in an editor window). The changes that were made may be annotated in the updated program source code, for example, by the addition of colored regions, syntax highlighting, or other visual cues, as depicted in the above examples.

In some cases, the updated program source code may not be immediately displayed, and rather, one or more graphical user interface element (e.g., a popup menu) may be displayed which depicts a textual representation of the change(s) that the update algorithm discovered when performing reverse evaluation. For example, the popup menu may include a message depicting the removal, replacement, and/or addition of one or more string characters. Hovering over the popup menu may preview the changes to the output and/or the program source code displayed in the editor window, and the popup menu may also include an option to revert the program to its original state.

In some cases, more than one valid program source code may be mapped to the updated output by the update algorithm. In those cases, the popup menu (or another graphical user interface facility) may depict each of the possible changes to the original program source code, and the user may choose from among them. Once the user makes a selection, the program source code may be immediately updated with the changes corresponding to the user's selection.

In some embodiments, a heuristic may be applied to automatically select one of a set of ambiguous edits, without requiring the user's intervention. Such a selection may be based on, for example, selecting the edit that affects the fewest number of characters in the original program source code.

Example Method for Bidirectional Evaluation

Figure 7:
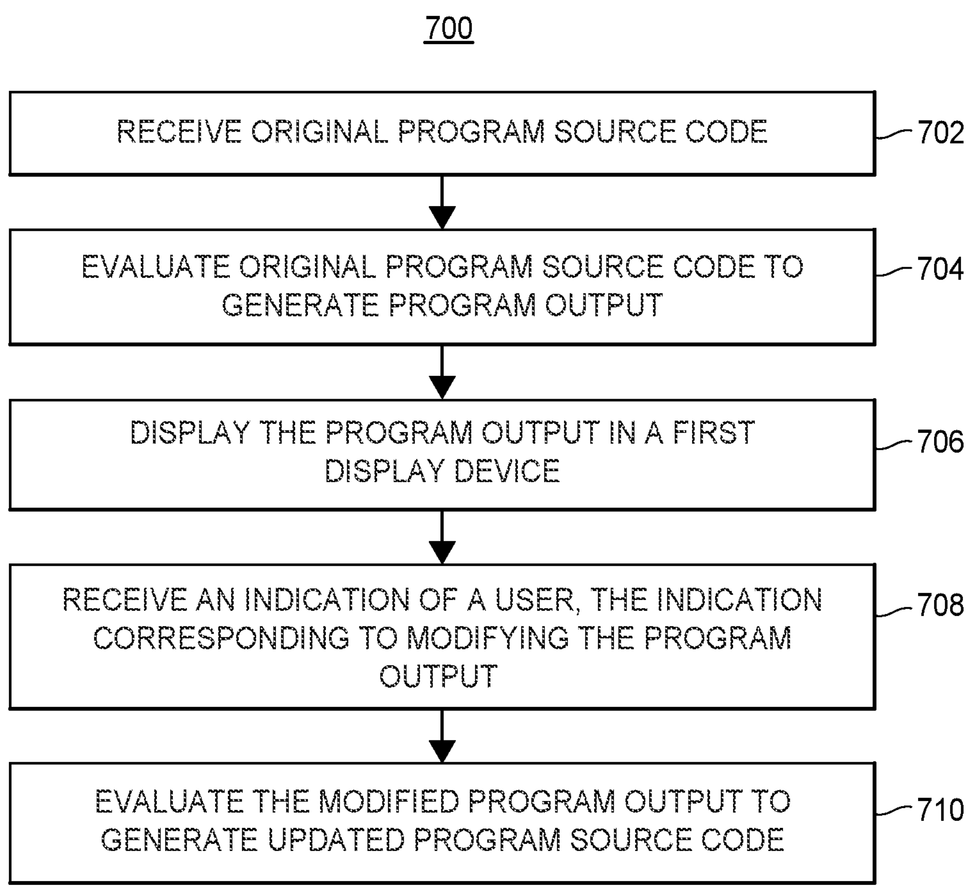
FIG. 7 depicts a flow diagram for performing bidirectional programming, according to an embodiment.

FIG. 7 depicts an example method 700 for performing bidirectional programming, according to an embodiment. The method 700 may include receiving original program source code (block 702). For example, the original program source code may be opened by the user in a programming environment in the client computing device 602 of FIG. 6. The programming environment may correspond to that depicted in, for example, FIG. 5*a* and FIG. 6. In an embodiment, the original program source code may programming include instructions in a programming language corresponding to the syntax discussed with respect to FIG. 1*a*.

In general, the program source code may be received and/or retrieved from any computer via a computer network, including from the remote computing device 606 of FIG. 6 via the computer network 604, and/or from a computer memory (e.g., from the memory 602B). Once received/retrieved, a file containing the program source code may be read, and the contents of that file displayed in a display device (e.g., the display device 602F of FIG. 6). The contents may be statically parsed, for example, to syntax-highlight the code for usability purposes.

Once the original program source code is displayed, it may be evaluated to generate a program output (block 704). The evaluation may be performed by the programming environment and/or by a separate component. For example, in some cases, an evaluation module (e.g., program module 602C) of the programming environment may read the program source code and input it into an interpreter. The interpreter may evaluate the program source code, using the forward half of the bidirectional evaluation techniques discussed above, and may generate an output corresponding to the result of the evaluation. The result of the evaluation may be a program output, and may be composed of any electronic data (e.g., strings, numbers, data structures, objects, records, expressions, etc.). In some embodiments, evaluating the code may be performed by a remote computing system, such as remote computing device 606. There, for example, evaluation may include transmitting the program source code via the computer network 604 to the remote computing device 606, wherein a module local to the remote computing device 606 including a language interpreter, compiler, and/or runtime may evaluate the program source code.

The program output generated at block 704 may be displayed in a display device of the user (e.g., the display device 602F of FIG. 6) (block 706). In some embodiments, the program output may be continuously re-displayed, each time the user makes any change to the program output. This may serve the important function, in some embodiments, of notifying the user that the change the user has made to the output has been accepted/persisted in the programming environment. However, in some embodiments, the output of the program source code may be transmitted to another local process (e.g., a different program executing in the same memory/address space) or a remote process (e.g., a different program executing in another computer). In some embodiments, the output may not be displayed, and may only be stored for later analysis, such as in database 608 of FIG. 6. The programming environment may include the ability to render the output of the evaluation. For example, if the output is display code, such as CSS and/or HTML, then the programming environment may use a browser toolkit (e.g., WebKit) to immediately render and display the output. In some embodiments, the evaluation of the program source code in method 700 may include injecting JavaScript or other ancillary code into the evaluation output. The JavaScript code may include, for example, event handlers for detecting changes to the output code.

Once the output of the program source code is displayed, a user may interact with the output directly, and may transmit indications corresponding to modifying the program output to the programming environment (block 708). The user who programmed the original program source code may or may not be the same user who interacts with the output. The interaction may take the form of a user clicking on the output, with a mouse pointer, and/or cursor. The user may access the output via a keyboard (e.g., a Tab key of a keyboard) or any other key(s). The user may edit existing elements in the output, using graphical user interface elements that are built-in to the programming environment (e.g., widgets, a DOM inspector, a contextual menu, an input field, etc). The user may also edit add, remove, and/or create new elements (i.e., make structural changes to the output) as discussed with respect to FIG. 5*i*.

After any indication(s) of the user corresponding to modifying the program input are received, the modified program output may be evaluated "in reverse" as discussed above. The result of modifying the program output may be an updated program source code, wherein the result of evaluating the program source code in the forward direction may output the modified program output (block 710). Evaluating the program in reverse may be used to determine and/or reconcile differences between the original program source code and the updated program source code. For example, as discussed in FIG. 5*c*, the programming environment may determine that particular line numbers (L2 and L3) are affected by the modified program output, and the specifics of the modifications may be determined (e.g., that a first group of one or more characters has been replaced by a second group of one or more characters).

It should be appreciated that after the modified program output is evaluated to generate updated program source code, the updated program source code and/or the modified program output may be displayed in a display device and/or graphical user interface. In some embodiments, the display device may correspond to the display at block 706. For example, a user may have two computer monitors, and the program source code may be displayed on one display, while the program output is displayed in another. In other embodiments, the first and second displays may be coupled to different computers, respectively. For example, the program source code may be displayed in a client (e.g., client computing device 602) and/or a server (e.g., remote computing device 606). The updated program source code may be transmitted, in some embodiments, over a network such as computer network 604.

Reverse evaluation may enable the programming environment to highlight more than one line of code in the updated program source code, to indicate the potential consequences of applying ambiguity in the updated program source code to the original program source code. The user may have the option of reviewing each of a plurality of ambiguous updates, wherein the user's review of each one causes the each updated program source code in the plurality of ambiguous updates to be displayed in realtime, thereby allowing the user to quickly determine which of the ambiguous updated program source code is intended/preferred. By allowing the user to directly manipulate the output of programs, without requiring the user to resort to reasoning about the original program source code, and by automatically generating updated program source code reflecting the user's desired edits to the output, the present techniques greatly improve the efficiency of software development.

Example Bidirectional Evaluation Language Embodiments

As noted above, the conventional approaches for writing inverse evaluators, or "unevaluators" include serious shortcomings. Thus, the present techniques provide methods and systems for applying Bidirectional Evaluation to multiple languages (e.g., PHP, Python, JavaScript, etc.).

Difference Language

In an embodiment, the present techniques enable multi-language support by 1) storing the final environment so that intermediate results can be cached and not recomputed on update and 2) detecting complex function applications (e.g., f(h(g(a)))), rewriting those applications to let-in expressions with temporary variables that may benefit from the caching. However, the foregoing two-step process may not apply to some semantics (e.g., nested lets, overridden variables/private variables in records, local functions and computed functions), and may lead to unoptimized behaviors.

Attempts to address a gap caused by rewriting by maintaining a "difference" (e.g., a representation of how a new value differs from a previous value) along with a back-propagated new value may also be error-prone. It should be appreciated that back-propagation of differences may be essential (e.g., to avoid exponential complexity of merging environments, when each value of the environment could also point to a substantial portion of the environment itself). Yet, new values and their differences may be treated independently and, as a result, discrepancies (i.e., bugs) may arise between new values and differences.

In summary, a language of "differences" may be incomplete because the language of differences used to express how a first expression differs from a second expression (i.e., either an indexed child is different, the expression was entirely replaced or for lists a number of removed/inserted elements at respective indices). Moreover, difference expressions may not enable the cloning of an element to another place, let alone any calculation of differences after cloning. For example, when manipulating tree-like structures (e.g., HTML), a user may observe that elements "move" between the tree, but such movement may not be reflected in the language of differences which, at most, described insertions and deletions within a list. The language of differences, alone, may not support alternatives, and as a result, any ambiguity in how the difference exists between a first and second value may necessitate re-running an entire update procedure.

Recursive (Edit Action) Language

In view of the foregoing, another style of evaluator may be needed in some scenarios. Thus, in a preferred embodiment, the present techniques include converting a first evaluator based on recursivity to a second evaluator based on rewriting, and then converting the second evaluator to a third evaluator producing a description of rewriting through Edit Actions. Specifically, instead of using differences, which have a symmetrical connotation, an embodiment includes a powerful recursive notion including one or more edit actions. The recursive embodiment described herein enables authors to obtain a much more flexible bidirectional evaluator. In fact, in some embodiments, the present techniques are readily and successfully applied to the JavaScript and PHP languages, to derive bidirectional evaluators much faster than expected.

The present techniques include an inductive set of self-contained "edit actions." Here, "self-contained" means that, inter alia, the edit actions 1) may fully replace the tuple (back-propagated value, differences with original), and 2) may encode more edit actions over various scenarios (e.g., the present techniques prove that the set of edit actions may form a monoid, meaning that the composition between them can also be expressed as another "edit action"). For example, instead of replaying an edit action script, an edit action may be factored and even be handled independently in a final user interface.

In some embodiments, edit actions may 1) encode an evaluation step of a Program evaluated by a small-step evaluator (Rewrite edit actions) and 2) express changes requested to the user to the final output (Output edit actions). The present techniques include a migration algorithm to "migrate" an Output edit action back through a Rewrite edit action to produce a Program edit action. The present techniques may also describe generalizing the migration algorithm in the case of many alternative Output edit actions (e.g., a version-space algebra). The present techniques may include a general methodology to convert an evaluator to a "Rewrite edit action"-producing evaluator, that computes an edit action representing how a final value is computed from an original program abstract syntax tree. Further, the present techniques describe how to apply this migration algorithm to effectively create unevaluators for multiple lambda calculus variants and computing languages (e.g., JavaScript, PHP, etc.). The present techniques include a comparison of the performance in view of a baseline unevaluator and prove a speed up of orders of magnitude.

Finally, the present techniques include a lens that can customize back-propagation behavior, and enable versions of List.map, Tree.map that can fully take into account clones, wrapping and unwrapping. Specifically, from one edit action, the present techniques may extract a shape-changing edit action and a value-changing action. For List.map and Tree.map, the shape-changing edit action can first be applied to the input value unmodified (e.g., clones in outputs result in clones in inputs the same way). The resulting input value then has the same shape as the output, and the original evaluation update algorithm can be applied, and will convert output value-changing edit actions (e.g., the edit actions for the values at the leaves of the tree) back to input value-changing edit actions and to the mapping function. By recombining the shape-change edit action with the input value-change edit action, the present techniques may obtain the final edit action on the original input. Without the lens including back-propagation behavior, the function List.map may be difficult to implement, due to insertions and deletions. With the above-described approach, implementing List.map is advantageously simplified, and clones between elements of the list and trees are supported.

A Basic Edit Action Language

In an embodiment, an edit action language is created by first defining a set of objects the edit action language will operate on. In some embodiments, the set of objects may be limited to certain records (e.g., to immutable records), wherein such records include a map from keys to certain records. For the sake of clarity and convenience, a conventional syntax may be used to describe such records (e.g., JavaScript for records and TypeScript for types). However, it should be appreciated that depending on implementation, any suitable syntax(es) may be used. An example object may be as follows:

Object={[key: String]: Object}

Examples of records are as follows:

```
{ }
{prog: { } }
{head: {a: { }}, tail: {head: {b: { }}, tail: { }}}
{0: {a: { }}, 1: {b: { }}}
{exp: {var: {m: { }}}, env: {head: {name: {m: { }},
  value: {d: { }}}}}
```

A record may be deconstructed with bracket syntax, meaning that if k is one of the keys of the record o, then o[k] is the value associated to k in o. To express an edit action on such objects, there is first a notion of "reuse", some parts will be reused as-this (with possible edit actions for some fields), some will be cloned from somewhere else (again with possible edit actions on some fields), some will be created from scratch (with a possible reuse of some fields). In an embodiment, a first naive encoding is minimalistic, in that any action is assumed to consist either of fully cloning a sub-record (without touching it) or creating a new record, leaving the possibility to express edit actions for one or more children:

```
type EditAction=
  Clone Path
  |New {[key: String]: EditAction}
type Path=Cons String Path|Nil
```

In some embodiments, a shorthand [key1, . . . key2] is used to mean 'Cons key1 (Cons . . . (Cons key2 Nil) . . . )'.

Applying an EditAction to an object (if applicable) may create a new object according to the following semantics:

apply (New {key1: action1, key2: action2}) object={key1: apply action1 object, key2: apply action2 object} apply (Clone (Cons key path)) object=apply (Clone path) object[key]

apply (Clone Nil) object=object

Further, the present techniques specify additional semantics for transformations that include seamlessly encoding insertions and deletions on a list, in addition to clones of elements:

apply (New { }) {anything: { } }
={ } apply (New {a: Clone [ }) {b: { }}
={a: {b: { }}} apply (Clone ["tail"]) {head: {a:{ }}, tail: {head: {b:{ }}, tail: { }}}
={head: {b:{ }}, tail: { }} apply (New {head: New {a: New{ }}, tail: Clone [ ]}) {head: {b:{ }}, tail: { }}
={head: {a:{ }}, tail: {head: {b:{ }}, tail: { }}} apply (New {head: Clone ["head"], tail: Clone [ ]}) {head: {b:{ }}, tail: { }}
={head: {b:{ }}, tail: {head: {b:{ }}, tail: { }}}

A composition of differences includes a property/assertion such that for each edit1 edit2 and object where the two members can be defined, apply (compose edit1 edit2) object===apply edit1 (apply edit2 object)

A function may be defined that obeys the above assertion:

compose (Clone Nil) editAction=editAction compose editAction (Clone Nil)=editAction compose (Clone (Cons h t)) (New subActions)=
compose t subActions[h]

compose (New subActions) editAction=
compose (New {k: compose sub editAction for (k: sub) in subActions})

compose (Clone (Cons head2 tail2)) (Clone (Cons head1 tail1))=
let (Clone tt)=compose (Clone (Cons head2 tail2)) (Clone tail1) in
Clone (Cons head1 tt)

The above-described language may describe all possible transformations. However, a user may encounter difficulty in distinguishing between nodes that are entirely replaced from scratch (i.e., new nodes), as opposed to nodes of which only a few sub-fields were modified (i.e., update nodes).

An Advanced Edit Action Language

A preferred embodiment may include a re-defined inductive set of edit actions, such that the fields of the cloned elements may be modified:

type EditAction=
Reuse(RelPath) {[key: String]: EditAction}
|New ({[key: String]: EditAction}|Integer|String|Boolean)

type RelPath={up: Int, down: Path}

For the above edit action definition, instead of absolute paths, relative paths are stored. Thus, at any node, an edit action of Reuse({up: 0, down: Nil}) { } is an identity. Furthermore, the re-defined inductive set simplifies reasoning about EditActions, especially when such EditActions are transformed. For example, an edit action that does not refer a parameter up an object tree may be copied from one place to another. It should be appreciated that similar apply and compose functions can be derived.

Example Back Propagation Implementation

The EditAction implementation described above can be used to enable back-propagation. For example, assume an interpreter that rewrites objects like {a: n} to values like {b: n, c: n}.

(1) Original Input: {a: 1} the interpreter would produce the following (2) Original Output: {b: 1, c: 1}

Let us suppose that the user comes in and modifies the original output by modifying the value of b, and wrapping the value of c but leaving it untouched:

(2') Modified Output: {b: 2, c: {d: 1}}

The present techniques may back-propagate these modifications to the original program {a: 1} by combining the two edit actions into one, which would result in:

(1') Expected modified Input: {a: {d: 2}}

The present techniques may also derive such modified input mechanically. using the edit actions described above. The horizontal edit action corresponding to the small-step evaluation from (1) to (2) is:

(1) to (2): New {b: Reuse (["a"]) { }, c: Reuse (["a"]) { }}

The vertical edit action corresponding to the user modifications from (2) to (3) is:

(2) to (2'): Reuse ([ ]) {b: New(2), c: New({d: Reuse([ ]) { }})}

Running the algorithm outputToInputEditAction((1) to (2), (2) to (2)) yields the following:

Reuse([ ]){a: New({d: DDNew(2)})} which, if applied to (1), would produce the expected (1').

FIG. 8 depicts an example output to input algorithm for enabling the back-propagation operations discussed above. The algorithm assumes a straightforward implementation of Reuse and New. In the algorithm, on the output, at the current location pointed by dStackPath (the workplace), the existing element is replaced by a clone of a tree element present elsewhere in the output (the source). The workplace's stack path is dStackPath. By following the output's stack paths in the hEditAction, the algorithm recovers the paths as they come from the input. All children diffs are recovered globally as if they were done on the source's path., yielding a list of global differences on the original input. If these differences consists of updates whose path contains the prefix dSourcePathOriginal, the algorithm assumes that they happen on the workplace in the input and were cloned from the source in the input.

The sourceStackPath corresponds to the dStackPath+relPath. The dPathOriginal refers to the path where the workplace came from in the input. The dSourcePathOriginal corresponds to the path where the source came from in the input. The clonePath refers to the relative path between an input's workplace and an input's source. When the edit action type is not a Reuse type, the algorithm collects absolute differences outside of the original path. The algorithm of FIG. 8 may store paths in a relative way, or as absolute paths from the root of each object.

Converting an Evaluator to an EditAction-Producing Evaluator

In some embodiments, to convert an evaluator to edit-action-producing evaluator, so that the evaluator can use outputToInputEditAction to back-propagate edit actions on the output to edit actions on the program, the following steps may be used, wherein the steps are illustrated in an environment-based call-by-value lambda calculus. The evaluate1 function below takes a ProgState and returns a Val:

```
Exp = { type: "var", name: String }
  | { type: "lambda", argName: String, body: Exp}
  | +55 type: "app", fun: Exp, arg: Exp}
Val = { type: "closure", argName: String, body: Exp, env: Env}
Env = { type: "cons", head: {name: String, val: Val}, tail: Env } | { type: "nil"}
ProgState = { exp: Exp, env: Env }
evaluate(ps: ProgState): Val {
  if(ps.exp.type == "lambda")
    return {type: "closure", argName: ps.exp.argName, body: ps.exp.body, env: ps.env};
  if(ps.exp.type == "var") {
    let env = ps.env;
    while(env.head.name != ps.exp.name) env = env.tail;
    return env.head.val;
  }
  let {argName, body, env } = evaluate({exp: ps.exp.fun, env: ps.Env1);
  let arg = evaluate({exp: ps.exp.arg, env: ps.Env});
  return evaluate({exp: body, env: {type: "cons", head:
      {name: argName, val: arg}, tail: env}});
}
```

The present techniques may make the evaluator tail-recursive, by eliminating the need for recursion by storing continuations as callbacks. To do so, for an evaluator that takes programs ProgState and produces values Val, the evaluator is refactored to take a ComputationState to return a ComputationState and repeatedly call itself until it reaches a final value. The ComputationState may be defined as:

```
type Computation = { type: "Compute", ps: ProgState}
    | {type: "Return", value: Val}
type Continuations = {type: "cons", tail: Continuations, head: ComputationState =>
  ComputationState}
    | {type: "nil"}
type ComputationState ={computation: Computation, continuations: Continuations}
```

The refactoring steps may include

1. Immediately after the start of the evaluator function, if the computation is a Return of a value, there should be a continuation left. The present techniques call the first continuation on the computation state by removing the first continuation, and returning the resulting computation state.
2. After treating the Return case, the computation has to be a Compute of a ProgState. The present techniques reuse the code of the evaluator, with the following changes:
   (a) Replace each return X; statements that do not involve the evaluator by

```
return {computation: {type: "Return", value: X},
continuations: (previous continuations)};
```

(b) Replace any let X=evaluate (P); C by

```
return {computation: P, continuations: {type: "cons",
head: ({computation: {value: X}, continuations} =>
{ C }, tail: (previous continuations)}}
```

3. Invoke the resulting evaluator in a while-loop so that the computation can continue until there is nothing else to compute. In the above example, the function evaluate1_1 is obtained, which is called from the function evaluate1:

```
evaluate1(ps: ProgState): Val {
  let cs = {computation: {type: "Compute", ps: ps}, continuations: { type: "nil" }};
  while(cs.computation.type !== "Return" || cs.continuations.type == "cons") {
    cs = evaluate1_1(cs);
  }
  return cs.computation.value;
}
evaluate1_1(cs: ComputationState): ComputationState {
  if(cs.computation.type == "Return") {
    if(cs.continuations.type == "cons")
      return cs.continuations.head({computation: cs.computation,
      continuations: cs.continuations.tail});
    else
      throw "Error: no way to continue computation";
  }
  let ps = cs.computation.ps;
  if(ps.exp.type == "lambda")
    return { computation: {type: "Return", value: {type: "closure",
```

-continued

```
    argName: ps.exp.argName, body: ps.exp.body, env: ps.env},
    continuations: cs.continuations }};
  if(ps.exp.type == "var") {
    let env = ps.env;
    while(env.head.name != ps.exp.name) env = env.tail;
    return { computation: {type: "Return", value: env.head.val},
      continuations: cs. continuations };
  }
  return { computation: { type: "Compute", ps: {exp: ps.exp.fun, env: ps.Env}},
         continuations: { type: "cons", tail: cs.continuations,
    head: ({computation: {value: {argName, body, env}}, continuations}) => {
      return { computation: {type: "Compute", ps: {exp: ps.exp.arg, env: ps.Env}|,
             continuations: {type: "cons", tail: continuations, head:
          ({computation: {value: arg}, continuations}) => {
            return {computation: {type: "Compute", ps: {exp: body, env:
                {type: "cons", head: {name: argName, val: arg}, tail: env}}},
            continuations: continuations};
          }
        }
    } } } };
}
```

In some embodiments, the present techniques may transform the ComputationState to a first-order data structure. Initially, continuations may be stored as closures, which may make them difficult to reason about, as the above-described Edit Actions cannot be applied directly to them. Thus, in some embodiments, continuations may be replaced by the data they require, including an identifier specifying which code may be called. For example, at the beginning of the equivalent of evaluate1_1 function, instead of calling the first continuation on the ComputationState, the present techniques may use a case disjunction to execute code that the original closure would have executed. In the above example, this would yield the function evaluate1_2 that replaces the function evaluate1_1:

```
evaluate1_2(cs: ComputationState): ComputationState {
  if(cs.computation.type == "Return") {
    if(cs.continuations.type == "cons") {
      let {head,tail} = cs.continuations;
      if(head.name == "afterFun") {
        let {computation: {value: {argName, body, env}}} = cs;
        let ps = head.data.ps;
        return { computation: {type: "Compute", ps: ps},
              continuations: {type: "cons", tail: tail, head:
            {name: "afterArg", data: {argName, body, env}}}};
      } else if(head.name == mafterArg") {
        let {argName, body, env} = head.data;
        let {computation: {value: arg}} = cs;
        return {computation: {type: "Compute", ps: {exp: body,
              env: {type: "cons", head: {name: argName, val: arg}, tail: env}}},
              continuations: tail};
      }
      throw "Unknown continuation"+ head.name;
    } else
      throw "Error: no way to continue computation";
  }
  let ps = cs.computation.ps;
  if(ps.exp.type == "lambda")
    return { computation: {type: "Return", value: {type: "closure",
          argName: ps.exp.argName, body: ps.exp.body, env: ps.env} },
          continuations: cs. continuations};
  if(ps.exp.type == "var") {
    let env = ps.env;
    while(env.head.name != ps.exp.name) env = env.tail;
    return { computation: {type: "Return", value: env.head.val},
          continuations: cs. continuations };
  }
  return { computation: { type: "Compute", ps: {exp: ps.exp.fun, env:
            ps.Env}}, continuations: {type: "cons", tail:
              cs.continuations,
    head: { name: "afterFun", data: {type: "Compute",
          ps: {exp: ps.exp.arg, env: ps.env}} } } };
  }
}
```

In some embodiments, the evaluator may be modified to return Edit Actions rather than ComputationState. Specifically, once the evaluate1_2 is updated to take and return a first-order structures consisting of only records and strings, the present techniques may provide that evaluate1_2 rewrite the computation state. Thus, instead of returning computations, the present techniques may return Edit Actions that lead to the resulting computations. This yields a new variant evaluate1_3 that calls this function evaluate1_3_1 by applying the resulting Edit actions to the current computation state, to obtain the next computation state. In the above example, this technique results in the function evaluate1_3 which replaces evaluate1_2:

```
evaluate1_3(cs: ComputationState): ComputationState {
  let editAction = evaluate1_3_1(ComputationState);
  return applyEditAction(editAction, cs);
}
evaluate1_3_1(cs: ComputationState): EditAction {
  if(cs.computation.type == "Return") {
    if(cs.continuations.type == "cons") {
      let {head,tail} = cs.continuations;
      if(head.name == "afterFun") {
        return New({
          computation: New({
            type: New("Compute"),
            ps: Reuse( ["continuations", "head", "data", "ps"]),
          }),
          continuations: New({
            type: New("cons"),
            head: New({
              name: New("afterArg"),
              data: Reuse( ["computation", "value"])
            }),
            tail: Reuse( ["continuations", "tail"])
          })
        });
      }else if(head.name == "afterArg") {
        let {argName, body, env} = head.data;
        let {computation: {value: arg}} =cs;
        return New({
          computation: New({
            type: New("Compute"),
            ps: New({
              exp: Reuse(["continuations", "head", "data", "body"])
              env: New({
                type: New("cons"),
                head: New({
                  name: Reuse(}"continuations", "head", "data", "argName"}),
                  val: Reuse(["computation", "value"])
                }),
                tail: Reuse(["continuations", "head", "data", "env"])
              })
            })
          });
          continuations: Reuse( ["continuations", "tail"])
        });
      }
      throw "Unknown continuation" +head.name;
    } else
      throw "Error: no way to continue computation";
  }
  let ps = cs.computation.ps;
  if(ps.exp.type == "lambda") {
    return Reuse([],{
              computation:
                New({type: New("Return"),
                  value: New({
                    type: New("closure"),
                    argName: Reuse(["ps", "exp", "argName]),
                    body: Reuse(["ps", "exp", body"]),
                    env: Reuse(["ps", "env"])})})});
  }
  if(ps.exp.type == "var") {
    let env = ps.env, n = 0;
    while(env.head.name != ps.exp.name) {env = env.tail; n++;}
    return Reuse([],{
              computation:
                New(}type: New("Return"),
                    value: Reuse(["ps", "env", ...fillArray("tail", n), "head"])})});
  }
  return New({
    computation:
      Reuse(["computation"],{
      ps: Reuse([],{
        exp: Reuse( ["fun"])
```

-continued

```
          })
        }),
      continuations:
        New({
          type: New("cons"),
          head: New({
            name: New("afterFun"),
            data: New({type: "Compute",
                      ps: New({exp: Reuse(["computation", "ps", "exp", "arg"])}),
                        env: Reuse(["computation", "ps", "env"])})})})
          }),
          tail: Reuse([])
        })
    });
  }
}
```

Thus, Edit Actions are computed depending on the computation state. When looking up a variable in the environment, evaluate1_3_1 also generates a custom Reuse path with the right amount of "tail" so that the path points to the value being used. The top-level use of Reuse ([ ], for both variables and lambdas enables the present techniques to not have to specify that the stack of continuations is the same, and to start specifying the reuse relative paths with "ps" rather than absolute paths with "computation", "ps". It should be appreciated that a Reuse could be used for the last return statement, but in such embodiments, a relative path may be required that goes "up" on the leaves, which may decrease readability. Moreover, those of skill in the art will appreciate that many ways to write the above Edit-Action-producing evaluator are envisioned. For example, instead of building the structure {type: "Compute", ps: . . . } in the continuation of the last return statement, an embodiment may embed the entire computation state, and/or the argument and the env. Some designs might be easier to reason about, although at the end, the algorithms may produce the same result.

Using Edit-Action-Producing Evaluators to Create Update Engines

Once the above techniques are implemented, to arrive at an evaluator that produces Edit-Action as a byproduct, and using the function outputToInputEditAction, as described in FIG. 8, the present techniques may implement a procedure to update programs when values are modified. This procedure may execute the program only once and record intermediate Edit Actions. It should be appreciated that recording intermediate Edit Actions is a step that may be pre-computed before running the update function in some embodiments. For clarity, the following description includes this evaluation as part of the update.

In the following example, update takes a program, an edit action that has been made on its output, and returns the new program. For that, update applies to the old program the edit action obtained by calling the subroutine update_1:

```
update(exp: Exp, editActionOnOutput; EditAction): Exp {
  let finalEditAction = update_l(exp, editActionOnOutput);
  return applyEditAction(finalEditAction, exp);
}
update_1(exp: Exp, editActionOnOutput: EditAction): EditAction {
  let intermediates = [ ];
  let cs = {computation: {type: "Compute", ps: {exp: exp, env: {type: "nil" }}},
            continuations: {type: "nil" }};
  while(cs.computation.type !== "Return" || cs.continuations.type == "cons") {
    let ea = evaluatel_3(cs);
    cs = applyEditAction(ea, cs);
    intermediates.push(ea);
  }
  let finalEditAction = editActionOnOutput;
  while(intermediates.length) > 0 {
    finalEditAction = outputToInputEditAction(intermediates.pop( ), finalEditAction);
  }
  return finalEditAction;
}
```

It should be appreciated that the while loop enables the support of local lenses, providing users ways to define reverse transformations themselves. The foregoing approach may be applied to easily scale to existing interpreters, without having to consider the update part. For example, and without limitation, reverse interpreters may be authored for the following languages:

- call by name substitution-based lambda calculus
- call by value substitution-based lambda calculus
- call by name environment-based lambda calculus
- call by value environment-based lambda calculus
- Krivine evaluator
- JavaScript
- PHP Implementing a Krivine Evaluator As described above, bidirectional evaluation is a technique that allows arbitrary expressions in a standard λ-calculus to be "run in reverse". In some embodiments of bidirectional evaluation, (1) an expression e is evaluated to a value v, (2) the user makes "small" changes to the value yielding v' (structurally equivalent to v), and (3) the new value v' is "pushed back" through the expression, generating repairs as necessary to ensure that the new expression e' (structurally equivalent to e) evaluates to v'.

Shown below is the syntax of a pure λ-calculus extended with constants c. The present techniques may employ natural (e.g., big-step, environment-style) semantics, where function values are closures. Call-by-value function closures (E, λx.e) may refer to call-by-value environments E—which bind call-by-value values—and call-by-name function closures (D, λx.e) to call-by-name environments D—which bind expression closures (D, e) yet to be evaluated. A stack S may be a list of call-by-name expression closures.

| | |
|---|---|
| $e::=c\mid\lambda x.e\mid x\mid e_1e_2$ | Expressions |
| $v::=c\mid(E,\lambda x.e)$ | Call-By-Value Values |
| $E::=-\mid E,x\mapsto v$ | Call-By-Value Environments |
| $u::=c(D,\lambda x.e)$ | Call-By-Name Values |
| $D::=-\mid D,x\mapsto(D_x,e)$ | Call-By-Name Environments |
| $S::=[\,]\mid(D,e)::S$ | Krivine Argument Stacks |

Herein, structural equivalence is defined as structural equivalence of expressions ($e_1\sim e_2$), values ($v_1\sim v_2$ and $u_1\sim u_2$), environments ($E_1\sim E_2$ and $D_1\sim D_2$), and expression closures ($E_1\vdash e_1\sim E_2\vdash e_2$ and $D_1\vdash e_1\sim D_2\vdash e_2$) is equality modulo constants $c_1$ and $c_2$, which may differ, at the leaves of terms.

Bidirectional Call-by-Value Evaluation

FIG. 9 depicts the bidirectional call-by-value evaluation rules, that may be extend the core language with numbers, strings, tuples, lists, etc. In addition to a conventional "forward" evaluator, there is a "backward" evaluator (also referred to as "evaluation update" or simply "update"), whose behavior is customizable. The environment-style semantics simplifies the presentation of backward evaluation; a substitution-based presentation would require tracking provenance.

Given an expression closure (E, e) (a "program") that evaluates to v, together with an updated value v', evaluation update traverses the evaluation derivation and rewrites the program to (E', e') such that it evaluates to v'. The first three update rules are as follows: Given a new constant c', the BV-U-Const rule retains the original environment and replaces the original constant. Given a new function closure (E', λx.e'), the BV-U-Fun rule replaces both the environment and expression. Given a new value v', the BV-U-Var rule replaces the environment binding corresponding to the variable x used; $E[x\mapsto v']$ denotes structure-preserving replacement.

The rule BV-U-App for function application is what enables values to be pushed back through all expression forms. The first two premises evaluate the function and argument expressions using forward evaluation, and the third premise pushes the new value v' back through the function body under the appropriate environment. Two key aspects of the remainder of the rule are as follows: first, that update generates three new terms to grapple with: $E_f'$, $v_2'$, and $e_f'$. The first and third are "pasted together" to form the new closure ($E_f'$, $\lambda x.e_f'$) that some new function expression $e_1'$ must evaluate to, and the second is the value that some new argument expression $e_2'$ must evaluate to; these obligations are handled recursively by update (the fourth and fifth premises). The second key is that two new environments $E_1$ and $E_2$ are generated; these are reconciled by the following merge operator, which requires that all uses of a variable be updated consistently in the output. It will be appreciated by those of skill in the art that in practice, it is often useful to allow the user to specify a single example of a change, to be propagated to other variable uses automatically. An alternative merge operator may be used, that trades soundness for practicality.

Herein, the cbv Environment Merge $E_1{}^{e_1}\oplus^{e_2}E_2$ is defined as follows:

$$\_^{e_1}\oplus^{e_2}\_=\_$$

$$(E_1, x\mapsto v_1)^{e1}\oplus^{e2}(E_2, x\mapsto v_2)=(E', x\mapsto v)$$

$$\text{where } E' = E_1{}^{e_1}\oplus^{e_2}E_2$$

$$\text{and } v=\begin{cases} v_1 & \text{if } v_1=v_2\\ v_1 & \text{if } x\notin freeVars(e_2)\\ v_2 & \text{if } x\notin freeVars(e_1)\end{cases}$$

Further, two theorems apply. First, the Structure Preservation of BV Update:

If $E\vdash e\Rightarrow_{BV}v$ and $v\sim v'$ and $E\vdash e\Leftarrow_{BV}v'\rightsquigarrow E'\vdash e'$, then $E\vdash e\sim E'\vdash e'$.

And secondly, the Soundness of BV Update

If $E\vdash e\Leftarrow_{BV}v'\rightsquigarrow E'\vdash e'$, then $E'\Rightarrow_{BV}v'$.

A call-by-name system largely follows the semantics of the call-by-value version described above.

Bidirectional Call-by-Name Evaluation

FIG. 10 depicts an example of bidirectional call-by-name evaluation. The BN-U-Const and BV-U-Fun rules are analogous to the call-by-value versions. The BN-U-Var rule for variables must now evaluate the expression closure to a value, and recursively update that evaluation derivation. Being call-by-name, rather than call-by-need, the present techniques do so every time the variable is used, without any memoization. The BN-U-App for application is a bit simpler than BV-U-App, because the argument expression is not forced to evaluate; thus, there is no updated argument expression to push back. Environment merge for call-by-name environments is similar to the merging described above.

Several theorems apply: First, Structure Preservation of BN Update. If $D\vdash e\Rightarrow_{BN}u$ and $u\sim u'$ and $D\vdash e\Leftarrow_{BN}u'\rightsquigarrow D'\vdash e'$, then $D\vdash e\sim D'\vdash e'$. Second, Soundness of BN Update. If $D\vdash e\Leftarrow_{BN}u'\rightsquigarrow D'\vdash e'$, then $D'\vdash e'\Rightarrow_{BN}u'$.

In addition to being sound with respect to forward call-by-name evaluation, it is sound with respect to forward call-by-value evaluation. To formalize this proposition below, the present techniques refer to the lifting $\lceil E\rceil$ and $\lceil v\rceil$ of by-value environments and values, respectively, to by-name versions, and to the evaluation $[\![(D, e)]\!]$ of a delayed expression closure to a by-value value.

Herein, BV Value and BV Environment Lifting are defined as follows:

$$\lceil(E_f,\lambda y.e)\rceil=(\lceil E_f\rceil,\lambda y.e)\;\lceil c\rceil=c$$

$$\lceil - \rceil=-\;\lceil E,x\rightsquigarrow c\rceil=\lceil E\rceil,x\rightsquigarrow(E,c)\;\lceil E,x\rightsquigarrow(E_f,\lambda y.e)\rceil=\lceil E\rceil,x\rightsquigarrow\lceil(E_f,\lambda y.e)\lceil$$

BN Value, BN Environment, and BN Closure Evaluation are defined as:

$$[\![c]\!] = c \quad [\![(D, \lambda x.e)]\!] = ([\![D]\!], \lambda x.e)$$

$$[\![-]\!] = -[\![D, x \mapsto (D_x, e)]\!] = [\![D]\!], x \mapsto [\![(D_x, e)]\!]$$

$$\frac{[\![D]\!] \vdash e \Rightarrow_{BV} v}{[\![(D, e)]\!] = v}$$

A further theorem is Completeness of BN Evaluation. If $E \vdash e \Rightarrow_{BV} v$, then $\lceil E \rceil \vdash e \Rightarrow_{BN} \lceil v \rceil$. And still further, the Soundness of BN Update for BV Evaluation. If $E \vdash e \Rightarrow_{BV} v$ and $\lceil E \rceil \vdash e \Leftarrow_{BN} \lceil v' \rceil \rightsquigarrow D' \vdash e'$, then $[\![(D', e')]\!] = v'$.

Krivine Evaluation

Lastly, the present techniques include a bidirectional "Krivine evaluator" in the style of the classic (forward) Krivine machine, an abstract machine that implements call-by-name semantics for the lambda-calculus. While lower-level than the "direct" call-by-name formulation, above, the forward and backward Krivine evaluators are even more closely aligned than the prior versions.

FIG. 11 depicts Krivine evaluator semantics, according to an embodiment. Following the approach of the Krivine machine, the forward evaluator maintains a stack S of arguments (i.e. expression closures). When evaluating an application $e_1$ $e_2$, rather than evaluating the $e_1$ to a function closure, the argument expression $e_2$—along with the current environment D—is pushed onto the stack S of function arguments (the K-E-App rule); only when a function expression "meets" a (non-empty) stack of arguments is the function body evaluated (the K-E-Fun-App rule). The K-E-Const, K-E-Fun, and K-E-Var rules are similar to the call-by-name system, now taking stacks into account.

The backward evaluator closely mirrors the forward direction. Recall the two keys for updating applications (BV-U-App and BN-U-App): pasting together new function closures to be pushed back to the function expression, and merging updated environments. Because the forward evaluation rule K-E-App does not syntactically manipulate a function closure, the update rule K-U-App does not construct a new closure to be pushed back. Indeed, only the environment merging aspect from the previous treatments is needed in K-U-App. The K-U-Fun-App rule for the new Krivine evaluation form—following the structure of the K-E-Fun-App rule—creates a new function closure and argument which will be reconciled by environment merge. It should be appreciated that existing approaches for turning the natural semantics formulation of the present techniques into an abstract state-transition machine (including the use of, e.g., markers or continuations) ought to work for turning the natural semantics into one of the "next 700 Krivine machines".

Several theorems apply, such as Structure Preservation of Krivine Update: If $(D \vdash e;\ S) \Rrightarrow u$ and $u \sim u'$ and $(D \vdash e;\ S) \Lleftarrow u' \rightsquigarrow (D' \vdash e';\ S')$, then $D \vdash e \sim D' \vdash e'$. Another theorem is Soundness of Krivine Update: If $(D \vdash e;\ S) \Rrightarrow u$ and $(D \vdash e;\ S) \Lleftarrow u' \rightsquigarrow (D' \vdash e';\ S')$, then $(D' \vdash e';\ S') \Rrightarrow u'$.

The following theorem connects the Krivine system to the above (natural-semantics style) call-by-name system (and, hence, the above call-by-value system)—analogous to the connection between the Krivine machine and traditional substitution-based call-by-name systems: Equivalence of Krivine Evaluation and BN Evaluation $(- \vdash e;\ [\,]) \Rrightarrow u$ iff $- \vdash e \Rightarrow_{BN} u$.

A corollary is the Soundess of Krivine Update for BN Evaluation: If $- \vdash e \Rightarrow_{BN} u$ and $(- \vdash e;\ [\,]) \Lleftarrow u' \rightsquigarrow (- \vdash e';\ [\,])$, then $- \vdash e' \Rightarrow_{BN} u'$. And, Soundess of Krivine Update for BV Evaluation: If $- \vdash e \Rightarrow_{BV} v$ and $(- \vdash e;\ [\,]) \Lleftarrow \lceil v' \rceil \rightsquigarrow (- \vdash e';\ [\,])$ then $- \vdash e' \Rightarrow_{BV} v'$.

Conclusions regarding the backward Krivine evaluator that will be appreciated of those of skill in the art include that first, the evaluator never creates new values (function closures, in particular) to be pushed back (like BV-U-App and BN-U-App do). Therefore, if the user interface is configured to disallow function values from being updated (that is, if the original program produces a first-order value c), then the K-U-Fun rule for bare function expressions can be omitted from the system. And second, unlike the call-by-value and call-by-name versions above, the backward Krivine evaluator does not refer to forward evaluation at all. The backward rules are straightforward analogs to the forward rules, using environment merge to reconcile duplicated environments. Advantageously, this simplicity helps when scaling the design and implementation of bidirectional evaluation to larger, more full-featured languages.

Rather than defining forward Krivine evaluation ? directly and then establishing its connection to the call-by-name system, some embodiments of the present techniques may define the semantics of forward Krivine evaluation by translation to call-by-name evaluation. For example, Krivine Forward BN Evaluation may be defined as follows:

$$\frac{x \notin D \quad (D, x \mapsto (D_1, e_1) \vdash ex;\ S) \Rrightarrow u}{(D \vdash e;\ (D_1, e_1)::S) \Rrightarrow u} \quad \frac{D \vdash e \Rrightarrow_{BN} u}{(D \vdash e;\ \square) \Rrightarrow u}$$

As with the direct by-name evaluator, the backward Krivine evaluator may update by-name evaluation, wherein translation differs in the empty stack case. For example, in some embodiments, Krivine Forward BV Evaluation may be defined as follows $$\frac{x \notin D \quad (D, x \mapsto (D_1, e_1) \vdash ex;\ S) \Rrightarrow v}{(D \vdash e;\ (D_1, e_1)::S) \Rrightarrow v} \quad \frac{[\![D]\!] \vdash e \Rrightarrow v}{(D \vdash e;\ \square) \Rrightarrow v}$$

A corollary follows a proposition Soundness of Krivine Update for BV Evaluation: If $(E \vdash e;\ S) \Rrightarrow v$ and $(E \vdash e;\ S) \Lleftarrow \lceil v' \rceil \rightsquigarrow (D' \vdash e';\ S')$, then $(D' \vdash e';\ S') \Rrightarrow v'$.

Namely, If $- \Rrightarrow e \Rightarrow_{BV} v$ and $(- \vdash e;\ [\ \ ]) \Lleftarrow \lceil v' \rceil \rightsquigarrow (- \vdash e';\ [\,])$, then $- \vdash e' \Rightarrow_{BV} v'$.

Example Bidirectional Evaluation Language Implementation

As noted above, the present techniques can be applied for many languages, such as a lambda calculus call-by-name substitution-based language, a lambda calculus call-by-value substitution-based language, a lambda calculus call-by-name environment-based language, a lambda calculus call-by-value environment-based language, and a krivine evaluation system. The following is a proof in JavaScript, demonstrating that the results described herein are reproducible.

JavaScript implementation

Please refer to computer program listing appendix, 01-JavascriptImplementation.txt JavaScript Verification Tests The following tests demonstrate that the above implementation behaves correctly for a series of inputs.

Standard Function Tests

Please refer to computer program listing appendix, 02-JavascriptVerificationTests.txt Lazy Substitution-Based Lambda Calculus Tests Please refer to computer program listing appendix, 03-LazySubstitutionBasedLambdaCalcululsTests.txt Substitution-Based Lambda Calculus, Computing Argument First Tests Please refer to computer program listing appendix, 04-SubstitutionBasedLambdaCalcululsComputingArgumentFirstTests.txt Environment-Based Call-By-Name Lambda Calculus Tests Please refer to computer program listing appendix, 05-EnvironmentBasedCallByNameLambdaCalculusTests.txt Environment-Based Call-By-Value Lambda Calculus Tests Please refer to computer program listing appendix, 06-EnvironmentBasedCallByValueLambdaCalculusTests.txt Krivine Evaluator Tests Please see computer program listing appendix, 07-KrivineEvaluator.txt The above JavaScript implementation and tests are for illustration purposes only and should not be considered limiting of other approaches. For example, those of skill in the art will appreciate that while the above tests are applicable to the above JavaScript implementation, additional implementations/application programming interfaces (e.g., PHP) are envisioned, with additional respective test suites. In fact, the above techniques are applicable to all programming languages now known or later developed.

ADDITIONAL CONSIDERATIONS

It should be appreciated that the tedium of the edit-run-view cycle described above may not be a mere annoyance. Computer programmers and other technology workers often spend hours per day typing on their keyboards, and over time, the repeated stress of such typing can cause injury. Insofar as the present techniques reduce the need for users to use physical input devices (e.g., mice, keyboards, etc.), additional, less intuitive/expected benefits may be realized, such as increased productivity leading to lower labor costs. The productivity gains discussed above with respect to software development also represent significant advancements in the state of the art, and are significant improvements to computer functionality. Specifically, text editors do not currently support bidirectional evaluation as described herein.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of facilitating bidirectional programming of a user, comprising:

receiving, via a processor, an original program source code, evaluating the original program source code to generate a program output, displaying, in a first display device of the user, one or both of (i) the original program source code, and (ii) the program output, receiving an indication of the user corresponding to modifying the program output; and evaluating the modified program output to generate an updated program source code, wherein the updated program source code, when evaluated, generates the modified program output; and wherein evaluating the modified program output to generate the updated program source code includes at least one of a tail-recursive optimization, a merging closure optimization or an edit difference optimization.

2. The method of claim 1, wherein the original program source code includes one or more instructions encoded in a general-purpose computer programming language.

3. The method of claim 1, wherein evaluating the original program source code to generate the program output includes generating HTML output.

4. The method of claim 1, wherein evaluating the modified program output to generate the updated program source code includes applying a user-defined lens to the modified program output.

5. The method of claim 1, further comprising, displaying, in a second display device of the user, one or both of (i) the updated program source code, and (ii) the modified program output.

6. The method of claim 5, wherein the user interacts with the second display device of the user to accept the modified program output.

7. The method of claim 5, wherein the updated program source code includes a plurality of ambiguous candidate source codes, each of which, when evaluated, generate the modified program output.

8. The method of claim 7, wherein displaying the updated program source code is based on applying a heuristic to automatically select one of the plurality of ambiguous candidate source codes.

9. A computing device configured for bidirectional programming of textual data by a user via a graphical user interface, the computing device comprising:

at least one display device, at least one processor, at least one memory, including computer-readable instructions that, when executed by the at least one processor, cause the computing device to:

display, in the at least one display device, an original program source code and a program output corresponding to evaluated original program source code, receive, via the graphical user interface, an indication of the user corresponding to modifying the program output; and evaluate the modified program output to generate an updated program source code using at least one of a tail-recursive optimization, a merging closure optimization or an edit difference optimization.

10. The computing device of claim 9, wherein the original program source code includes one or more instructions encoded general-purpose computer programming language.

11. The computing device of claim 9, including further instructions that, when executed cause the computing device to:

output HTML.

12. The computing device of claim 9, including further instructions that, when executed, cause the computing device to:

apply a user-defined lens to the modified program output.

13. The computing device of claim 9, wherein the updated program source code includes a plurality of ambiguous candidate source codes, each of which, when evaluated, generate the modified program output.

14. The computing device of claim 13, including further instructions that, when executed, cause the computing device to:

apply a heuristic to automatically select one of the plurality of ambiguous candidate source codes.

15. The computing device of claim 9, including further instructions that, when executed cause the computing device to:

display, in the at least one display device, one or both of (i) the updated program source code, and (ii) the modified program output.

16. The computing device of claim 15, including further instructions that, when executed, cause the computing device to:

listen for a graphical user interface event corresponding to an action of a user, wherein the action represents the user's acceptance of the modified program output.

17. A computing device including a non-transitory computer-readable medium storing a programming environment application that, when activated, causes the computing device to:

evaluate, in a forward direction, an original program source code to generate an output, receive, via an input device, an indication of a user, the indication affecting a state of the output, evaluate, in a reverse direction, the output, to generate an updated program source code, wherein evaluating the output to generate the updated program source code includes at least one of a tail-recursive optimization, a merging closure optimization or an edit difference optimization; and display, in a display screen, the output and the updated program source code.

18. The computing device as recited in claim 17, wherein the updated program source code includes a plurality of ambiguous candidate source codes, and wherein the programming environment application further causes the computing device to:

display, in the display screen, the plurality of ambiguous candidate source codes, receive, via the input device, a selection of the user corresponding to one of the plurality of ambiguous candidate source codes; and in response to the selection of the user, display, in the display screen, the one of the plurality of ambiguous candidate source codes.

19. A method of facilitating bidirectional programming of a user, comprising:

receiving, via a processor, an original program source code, evaluating the original program source code to generate a program output, displaying, in a first display device of the user, one or both of (i) the original program source code, and (ii) the program output, receiving an indication of the user corresponding to modifying the program output; and evaluating the modified program output to generate an updated program source code, wherein the updated program source code, when evaluated, generates the modified program output, wherein the updated program source code includes a plurality of ambiguous candidate source codes, each of which, when evaluated, generate the modified program output; and wherein displaying the updated program source code is based on applying a heuristic to automatically select one of the plurality of ambiguous candidate source codes.

20. A computing device configured for bidirectional programming of textual data by a user via a graphical user interface, the computing device comprising:

at least one display device, at least one processor, at least one memory, including computer-readable instructions that, when executed by the at least one processor, cause the computing device to:

display, in the at least one display device, an original program source code and a program output corresponding to evaluated original program source code, receive, via the graphical user interface, an indication of the user corresponding to modifying the program output, evaluate the modified program output to generate an updated program source code, wherein the updated program source code includes a plurality of ambiguous candidate source codes, each of which, when evaluated, generate the modified program output; and apply a heuristic to automatically select one of the plurality of ambiguous candidate source codes.

* * * * *